US008959033B1

(12) United States Patent
Oakes, III et al.

(10) Patent No.: US 8,959,033 B1
(45) Date of Patent: Feb. 17, 2015

(54) SYSTEMS AND METHODS FOR VERIFICATION OF REMOTELY DEPOSITED CHECKS

(75) Inventors: Charles Lee Oakes, III, San Antonio, TX (US); Randy Ray Morlen, San Antonio, TX (US); R. Bharat Nuggehalli, San Antonio, TX (US); Carol Ann Walls, San Antonio, TX (US); Gabriel Glenn Gavia, San Antonio, TX (US); Reynaldo Medina, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 793 days.

(21) Appl. No.: 11/686,924

(22) Filed: Mar. 15, 2007

(51) Int. Cl.
G06Q 40/00 (2012.01)
G06K 9/00 (2006.01)
G07D 11/00 (2006.01)

(52) U.S. Cl.
USPC ............................. 705/45; 382/137; 235/379

(58) Field of Classification Search
USPC ............................................ 705/35–45, 1.1
See application file for complete search history.

(56) References Cited

U.S. PATENT DOCUMENTS

| 3,005,282 | A | 10/1961 | Christiansen |
| 3,341,820 | A | 9/1967 | Grillmeier, Jr. et al. |
| 3,576,972 | A | 5/1971 | Wood |
| 3,593,913 | A | 7/1971 | Bremer |
| 3,620,553 | A | 11/1971 | Donovan |
| 3,648,242 | A | 3/1972 | Grosbard |
| 3,800,124 | A | 3/1974 | Walsh |
| 3,816,943 | A | 6/1974 | Henry |
| 4,002,356 | A | 1/1977 | Weidmann |
| 4,060,711 | A | 11/1977 | Buros |
| 4,070,649 | A | 1/1978 | Wright, Jr. et al. |
| 4,128,202 | A | 12/1978 | Buros |
| 4,136,471 | A | 1/1979 | Austin |
| 4,205,780 | A | 6/1980 | Burns |
| 4,264,808 | A | 4/1981 | Owens |
| 4,305,216 | A | 12/1981 | Skelton |
| 4,321,672 | A | 3/1982 | Braun |
| 4,433,436 | A | 2/1984 | Carnes |
| 4,454,610 | A | 6/1984 | Sziklai |

(Continued)

FOREIGN PATENT DOCUMENTS

EP 0 984 410 A1 3/2000

OTHER PUBLICATIONS

Wells Fargo—2005 News Releases, "The New Wells Faro Electronic Deposit Services Break Through Banking Boundaries in the Age of Check 21", San Francisco, Mar. 28, 2005, Retrieved from the internet <https:www.wellsfargo.com/press/3282005_Check21?year=2005>.*

(Continued)

Primary Examiner — Mohammad Z Shaikh
(74) Attorney, Agent, or Firm — Brinks Gilson & Lione

(57) ABSTRACT

Verification of remotely deposited checks may be conducted in a system or for electronically receiving check images from customers and automatically initiating a deposit of funds associated with such check. Verification may comprise analyzing an image to detecting a presence of signatures, e.g. a payor signature and an endorsement, on a received check image so as to validate a check. Verification may further comprise conducting "face recognition" of a received check image to verify it's authenticity and/or detecting MICR line indications that a check is no longer valid.

27 Claims, 6 Drawing Sheets

(56) References Cited

U.S. PATENT DOCUMENTS

| | | | |
|---|---|---|---|
| RE31,692 E | 10/1984 | Tyburski et al. | |
| 4,523,330 A | 6/1985 | Cain | |
| 4,636,099 A | 1/1987 | Goldston | |
| 4,640,413 A | 2/1987 | Kaplan | |
| 4,644,144 A | 2/1987 | Chandek | |
| 4,722,444 A | 2/1988 | Murphy | |
| 4,722,544 A | 2/1988 | Weber | |
| 4,727,435 A | 2/1988 | Otani et al. | |
| 4,774,663 A | 9/1988 | Musmanno | |
| 4,790,475 A | 12/1988 | Griffin | |
| 4,806,780 A | 2/1989 | Yamamoto | |
| 4,837,693 A | 6/1989 | Schotz | |
| 4,890,228 A | 12/1989 | Longfield | |
| 4,927,071 A | 5/1990 | Wood | |
| 4,934,587 A | 6/1990 | McNabb | |
| 4,960,981 A | 10/1990 | Benton | |
| 4,975,735 A | 12/1990 | Bright | |
| 5,022,683 A | 6/1991 | Barbour | |
| 5,053,607 A | 10/1991 | Carlson | |
| 5,146,606 A | 9/1992 | Grondalski | |
| 5,157,620 A | 10/1992 | Shaar | |
| 5,159,548 A | 10/1992 | Caslavka | |
| 5,191,525 A | 3/1993 | LeBrun | |
| 5,193,121 A | 3/1993 | Elischer et al. | |
| 5,220,501 A | 6/1993 | Lawlor | |
| 5,227,863 A | 7/1993 | Bilbrey et al. | |
| 5,229,589 A | 7/1993 | Schneider | |
| 5,237,159 A | 8/1993 | Stephens | |
| 5,257,320 A | 10/1993 | Etherington et al. | |
| 5,265,008 A | 11/1993 | Benton | |
| 5,321,816 A | 6/1994 | Rogan | |
| 5,347,302 A | 9/1994 | Simonoff | |
| 5,350,906 A | 9/1994 | Brody | |
| 5,373,550 A | 12/1994 | Campbell | |
| 5,419,588 A | 5/1995 | Wood | |
| 5,422,467 A | 6/1995 | Graef | |
| 5,444,794 A | 8/1995 | Uhland, Sr. | |
| 5,475,403 A | 12/1995 | Havlovick et al. | |
| 5,504,538 A | 4/1996 | Tsujihara | |
| 5,504,677 A | 4/1996 | Pollin | |
| 5,528,387 A | 6/1996 | Kelly et al. | |
| 5,577,179 A | 11/1996 | Blank | |
| 5,583,759 A | 12/1996 | Geer | |
| 5,590,196 A | 12/1996 | Moreau | |
| 5,594,225 A | 1/1997 | Botvin | |
| 5,598,969 A | 2/1997 | Ong | |
| 5,602,936 A | 2/1997 | Green | |
| 5,610,726 A | 3/1997 | Nonoshita | |
| 5,611,028 A | 3/1997 | Shibasaki | |
| 5,630,073 A | 5/1997 | Nolan | |
| 5,631,984 A | 5/1997 | Graf et al. | |
| 5,668,897 A | 9/1997 | Stolfo | |
| 5,673,320 A | 9/1997 | Ray | |
| 5,677,955 A | 10/1997 | Doggett | |
| 5,678,046 A | 10/1997 | Cahill et al. | |
| 5,679,938 A | 10/1997 | Templeton | |
| 5,680,611 A | 10/1997 | Rail | |
| 5,691,524 A | 11/1997 | Josephson | |
| 5,699,452 A | 12/1997 | Vaidyanathan | |
| 5,734,747 A | 3/1998 | Vaidyanathan | |
| 5,737,440 A | 4/1998 | Kunkler | |
| 5,748,780 A | 5/1998 | Stolfo | |
| 5,751,842 A | 5/1998 | Riach | |
| 5,784,503 A | 7/1998 | Bleecker, III et al. | |
| 5,830,609 A | 11/1998 | Warner | |
| 5,832,463 A | 11/1998 | Funk | |
| 5,838,814 A | 11/1998 | Moore | |
| 5,863,075 A | 1/1999 | Rich | |
| 5,870,456 A | 2/1999 | Rogers | |
| 5,870,724 A | 2/1999 | Lawlor | |
| 5,870,725 A | 2/1999 | Bellinger et al. | |
| 5,878,337 A | 3/1999 | Joao | |
| 5,893,101 A | 4/1999 | Balogh et al. | |
| 5,897,625 A | 4/1999 | Gustin | |
| 5,898,157 A | 4/1999 | Mangili et al. | |
| 5,901,253 A | 5/1999 | Tretter | |
| 5,903,878 A | 5/1999 | Talati | |
| 5,903,881 A | 5/1999 | Schrader | |
| 5,910,988 A | 6/1999 | Ballard | 705/75 |
| 5,917,931 A | 6/1999 | Kunkler | |
| 5,924,737 A | 7/1999 | Schrupp | |
| 5,926,548 A | 7/1999 | Okamoto | |
| 5,930,778 A | 7/1999 | Geer | |
| 5,937,396 A | 8/1999 | Konya | |
| 5,940,844 A | 8/1999 | Cahill | |
| 5,982,918 A | 11/1999 | Mennie | |
| 5,987,439 A | 11/1999 | Gustin | |
| 6,012,048 A | 1/2000 | Gustin et al. | |
| 6,014,454 A | 1/2000 | Kunkler | |
| 6,021,202 A | 2/2000 | Anderson | |
| 6,021,397 A | 2/2000 | Jones | |
| 6,029,887 A | 2/2000 | Furuhashi | |
| 6,030,000 A | 2/2000 | Diamond | |
| 6,032,137 A | 2/2000 | Ballard | 705/75 |
| 6,038,553 A | 3/2000 | Hyde | |
| 6,053,405 A | 4/2000 | Irwin, Jr. et al. | |
| 6,073,119 A | 6/2000 | Borenmisza-wahr et al. | |
| 6,085,168 A | 7/2000 | Mori | |
| 6,097,834 A | 8/2000 | Krouse | |
| 6,097,845 A | 8/2000 | Ng et al. | |
| 6,097,885 A | 8/2000 | Rayner | |
| 6,105,865 A | 8/2000 | Hardesty | |
| 6,141,339 A | 10/2000 | Kaplan et al. | |
| 6,145,738 A | 11/2000 | Stinson et al. | |
| 6,151,426 A | 11/2000 | Lee | |
| 6,159,585 A | 12/2000 | Rittenhouse | |
| 6,170,744 B1 | 1/2001 | Lee | |
| 6,188,506 B1 | 2/2001 | Kaiserman | |
| 6,189,785 B1 | 2/2001 | Lowery | |
| 6,192,165 B1 | 2/2001 | Irons | |
| 6,195,694 B1 | 2/2001 | Chen et al. | |
| 6,199,055 B1 | 3/2001 | Kara | |
| 6,236,009 B1 | 5/2001 | Emigh et al. | |
| 6,243,689 B1 | 6/2001 | Norton | |
| 6,278,983 B1 | 8/2001 | Ball | |
| 6,282,826 B1 | 9/2001 | Richards | |
| 6,293,469 B1 | 9/2001 | Masson et al. | |
| 6,304,860 B1 | 10/2001 | Martin | |
| 6,314,452 B1 | 11/2001 | Dekel | |
| 6,317,727 B1 | 11/2001 | May | |
| 6,328,207 B1 | 12/2001 | Gregoire et al. | |
| 6,330,546 B1 | 12/2001 | Gopinathan et al. | |
| 6,339,658 B1 | 1/2002 | Moccagatta | |
| 6,363,164 B1 | 3/2002 | Jones et al. | |
| 6,390,362 B1 | 5/2002 | Martin | |
| 6,397,196 B1 | 5/2002 | Kravetz | |
| 6,408,084 B1 | 6/2002 | Foley | |
| 6,411,725 B1 | 6/2002 | Rhoads | |
| 6,411,737 B2 | 6/2002 | Wesolkowski et al. | |
| 6,411,938 B1 | 6/2002 | Gates et al. | |
| 6,413,305 B1 | 7/2002 | Mehta | |
| 6,417,869 B1 | 7/2002 | Do | |
| 6,425,017 B1 | 7/2002 | Dievendorff | |
| 6,429,952 B1 | 8/2002 | Olbricht | |
| 6,439,454 B1 | 8/2002 | Masson et al. | |
| 6,449,397 B1 | 9/2002 | Che-chu | |
| 6,450,403 B1 | 9/2002 | Martens et al. | 235/379 |
| 6,464,134 B1 * | 10/2002 | Page | 235/379 |
| 6,470,325 B1 | 10/2002 | Leemhuis | |
| 6,505,178 B1 | 1/2003 | Flenley | |
| 6,546,119 B2 | 4/2003 | Ciolli et al. | |
| 6,574,609 B1 | 6/2003 | Downs | |
| 6,578,760 B1 | 6/2003 | Otto | |
| 6,587,837 B1 | 7/2003 | Spagna | |
| 6,606,117 B1 | 8/2003 | Windle | |
| 6,609,200 B2 | 8/2003 | Anderson | |
| 6,611,598 B1 * | 8/2003 | Hayosh | 380/54 |
| 6,614,930 B1 | 9/2003 | Agnihotri et al. | |
| 6,643,416 B1 | 11/2003 | Daniels | |
| 6,654,487 B1 | 11/2003 | Downs, Jr. | |
| 6,661,910 B2 | 12/2003 | Jones et al. | |
| 6,672,452 B1 | 1/2004 | Alves | |
| 6,682,452 B2 | 1/2004 | Quintus | |
| 6,695,204 B1 | 2/2004 | Stinson | |

(56) References Cited

U.S. PATENT DOCUMENTS

| | | | |
|---|---|---|---|
| 6,711,474 B1 | 3/2004 | Treyz et al. | |
| 6,726,097 B2 | 4/2004 | Graef | |
| 6,728,397 B2 | 4/2004 | Mcneal | |
| 6,738,496 B1 | 5/2004 | Van Hall | |
| 6,742,128 B1 | 5/2004 | Joiner | |
| 6,745,186 B1 | 6/2004 | Testa et al. | |
| 6,754,640 B2 | 6/2004 | Bozeman | |
| 6,755,340 B1 | 6/2004 | Voss | |
| 6,763,226 B1 | 7/2004 | McZeal | |
| 6,781,962 B1 | 8/2004 | Williams | |
| 6,786,398 B1 | 9/2004 | Stinson | |
| 6,789,054 B1 | 9/2004 | Makhlouf | |
| 6,796,491 B2 | 9/2004 | Nakajima | |
| 6,806,903 B1 | 10/2004 | Okisu et al. | |
| 6,813,733 B1 | 11/2004 | Li | |
| 6,829,704 B2 | 12/2004 | Zhang | |
| 6,844,885 B2 | 1/2005 | Anderson | |
| 6,856,965 B1 * | 2/2005 | Stinson et al. | 705/21 |
| 6,863,214 B2 | 3/2005 | Garner et al. | |
| 6,870,947 B2 | 3/2005 | Kelland | |
| 6,883,140 B1 | 4/2005 | Acker | |
| 6,898,314 B2 | 5/2005 | Kung et al. | |
| 6,902,105 B2 | 6/2005 | Koakutsu | |
| 6,913,188 B2 | 7/2005 | Wong | |
| 6,931,591 B1 | 8/2005 | Brown | |
| 6,934,719 B2 | 8/2005 | Nally | |
| 6,957,770 B1 | 10/2005 | Robinson | |
| 6,961,689 B1 | 11/2005 | Greenberg | |
| 6,970,843 B1 | 11/2005 | Forte | |
| 6,973,589 B2 | 12/2005 | Wright | |
| 6,983,886 B2 | 1/2006 | Natsukari et al. | |
| 6,993,507 B2 | 1/2006 | Meyer | |
| 6,996,263 B2 | 2/2006 | Jones et al. | |
| 6,999,943 B1 | 2/2006 | Johnson | |
| 7,003,040 B2 | 2/2006 | Yi | |
| 7,004,382 B2 | 2/2006 | Sandru | |
| 7,010,155 B2 | 3/2006 | Koakutsu et al. | |
| 7,010,507 B1 | 3/2006 | Anderson | |
| 7,016,704 B2 | 3/2006 | Pallakoff | |
| 7,039,048 B1 | 5/2006 | Monta | |
| 7,058,036 B1 | 6/2006 | Yu | |
| 7,062,099 B2 | 6/2006 | Li et al. | |
| 7,062,456 B1 | 6/2006 | Riehl et al. | |
| 7,062,768 B2 | 6/2006 | Kubo | |
| 7,072,862 B1 | 7/2006 | Wilson | |
| 7,076,458 B2 | 7/2006 | Lawlor et al. | |
| 7,086,003 B2 | 8/2006 | Demsky | |
| 7,092,561 B2 | 8/2006 | Downs, Jr. | |
| 7,104,443 B1 | 9/2006 | Paul et al. | |
| 7,113,925 B2 | 9/2006 | Waserstein | |
| 7,114,649 B2 | 10/2006 | Nelson | |
| 7,139,594 B2 | 11/2006 | Nagatomo | |
| 7,140,539 B1 | 11/2006 | Crews | |
| 7,163,347 B2 | 1/2007 | Lugg | |
| 7,178,721 B2 | 2/2007 | Maloney | |
| 7,181,430 B1 | 2/2007 | Buchanan et al. | |
| 7,184,980 B2 | 2/2007 | Allen-Rouman et al. | |
| 7,197,173 B2 | 3/2007 | Jones et al. | |
| 7,200,255 B2 | 4/2007 | Jones | |
| 7,204,412 B2 | 4/2007 | Foss, Jr. | |
| 7,216,106 B1 | 5/2007 | Buchanan | |
| 7,219,082 B2 | 5/2007 | Forte | |
| 7,219,831 B2 | 5/2007 | Murata | |
| 7,249,076 B1 | 7/2007 | Pendleton | |
| 7,252,224 B2 | 8/2007 | Verma | |
| 7,257,246 B1 | 8/2007 | Brodie et al. | |
| 7,266,230 B2 | 9/2007 | Doran | |
| 7,290,034 B2 | 10/2007 | Budd | |
| 7,299,970 B1 | 11/2007 | Ching | |
| 7,299,979 B2 | 11/2007 | Phillips | |
| 7,313,543 B1 | 12/2007 | Crane | |
| 7,314,163 B1 | 1/2008 | Crews et al. | |
| 7,321,874 B2 | 1/2008 | Dilip | |
| 7,321,875 B2 | 1/2008 | Dilip | |
| 7,325,725 B2 | 2/2008 | Foss, Jr. | |
| 7,328,190 B2 | 2/2008 | Smith et al. | |
| 7,330,604 B2 | 2/2008 | Wu et al. | |
| 7,336,813 B2 | 2/2008 | Prakash et al. | |
| 7,343,320 B1 | 3/2008 | Treyz | |
| 7,349,566 B2 | 3/2008 | Jones et al. | |
| 7,356,505 B2 | 4/2008 | March | |
| 7,377,425 B1 | 5/2008 | Ma | |
| 7,379,978 B2 * | 5/2008 | Anderson et al. | 709/219 |
| 7,385,631 B2 | 6/2008 | Maeno | |
| 7,386,511 B2 | 6/2008 | Buchanan | |
| 7,391,897 B2 | 6/2008 | Jones et al. | |
| 7,391,934 B2 | 6/2008 | Goodall et al. | |
| 7,392,935 B2 * | 7/2008 | Byrne et al. | 235/379 |
| 7,401,048 B2 | 7/2008 | Rosedale | |
| 7,403,917 B1 | 7/2008 | Larsen | |
| 7,406,198 B2 | 7/2008 | Aoki et al. | |
| 7,421,107 B2 * | 9/2008 | Lugg | 382/139 |
| 7,421,410 B1 | 9/2008 | Schechtman et al. | |
| 7,433,098 B2 | 10/2008 | Klein et al. | |
| 7,437,327 B2 | 10/2008 | Lam | |
| 7,440,924 B2 * | 10/2008 | Buchanan et al. | 705/45 |
| 7,447,347 B2 | 11/2008 | Weber | |
| 7,455,220 B2 | 11/2008 | Phillips | |
| 7,455,221 B2 | 11/2008 | Sheaffer | |
| 7,460,108 B2 | 12/2008 | Tamura | |
| 7,461,779 B2 | 12/2008 | Ramachandran | |
| 7,461,780 B2 | 12/2008 | Potts | |
| 7,471,818 B1 | 12/2008 | Price | |
| 7,475,040 B2 | 1/2009 | Buchanan | |
| 7,477,923 B2 | 1/2009 | Wallmark | |
| 7,480,382 B2 | 1/2009 | Dunbar | |
| 7,480,422 B2 | 1/2009 | Ackley et al. | |
| 7,489,953 B2 | 2/2009 | Griffin | |
| 7,490,242 B2 | 2/2009 | Torres | |
| 7,497,429 B2 | 3/2009 | Reynders | |
| 7,503,486 B2 | 3/2009 | Ahles | |
| 7,505,759 B1 | 3/2009 | Rahman | |
| 7,506,261 B2 | 3/2009 | Satou | |
| 7,509,287 B2 | 3/2009 | Nutahara | |
| 7,512,564 B1 | 3/2009 | Geer | |
| 7,519,560 B2 | 4/2009 | Lam | |
| 7,520,420 B2 | 4/2009 | Phillips | |
| 7,520,422 B1 | 4/2009 | Robinson et al. | |
| 7,536,354 B1 | 5/2009 | deGroeve | |
| 7,536,440 B2 | 5/2009 | Budd | |
| 7,539,646 B2 | 5/2009 | Gilder | |
| 7,540,408 B2 | 6/2009 | Levine | |
| 7,542,598 B2 | 6/2009 | Jones | |
| 7,545,529 B2 | 6/2009 | Borrey et al. | |
| 7,548,641 B2 | 6/2009 | Gilson et al. | |
| 7,566,002 B2 | 7/2009 | Love et al. | |
| 7,571,848 B2 | 8/2009 | Cohen | |
| 7,587,066 B2 | 9/2009 | Cordery et al. | |
| 7,587,363 B2 | 9/2009 | Cataline | |
| 7,590,275 B2 | 9/2009 | Clarke et al. | |
| 7,599,543 B2 | 10/2009 | Jones | |
| 7,599,888 B2 | 10/2009 | Manfre | |
| 7,602,956 B2 | 10/2009 | Jones | |
| 7,606,762 B1 | 10/2009 | Heit | |
| 7,609,873 B2 | 10/2009 | Foth et al. | |
| 7,609,889 B2 * | 10/2009 | Guo et al. | 382/182 |
| 7,619,721 B2 | 11/2009 | Jones | |
| 7,620,231 B2 | 11/2009 | Jones | |
| 7,620,604 B1 | 11/2009 | Bueche, Jr. | |
| 7,630,518 B2 | 12/2009 | Frew et al. | |
| 7,644,037 B1 | 1/2010 | Ostrovsky | |
| 7,644,043 B2 | 1/2010 | Minowa | |
| 7,647,275 B2 | 1/2010 | Jones | |
| 7,668,363 B2 | 2/2010 | Price | |
| 7,672,940 B2 | 3/2010 | Viola | |
| 7,676,409 B1 | 3/2010 | Ahmad | |
| 7,680,735 B2 | 3/2010 | Loy | |
| 7,689,482 B2 | 3/2010 | Lam | |
| 7,697,776 B2 | 4/2010 | Wu et al. | |
| 7,698,222 B1 | 4/2010 | Bueche, Jr. | |
| 7,702,588 B2 | 4/2010 | Gilder et al. | |
| 7,720,735 B2 * | 5/2010 | Anderson et al. | 705/35 |
| 7,734,545 B1 | 6/2010 | Fogliano | |
| 7,743,979 B2 | 6/2010 | Fredman | |

(56) References Cited

U.S. PATENT DOCUMENTS

| | | |
|---|---|---|
| 7,753,268 B1 | 7/2010 | Robinson et al. |
| 7,761,358 B2 | 7/2010 | Craig et al. |
| 7,766,244 B1 | 8/2010 | Field |
| 7,769,650 B2 | 8/2010 | Bleunven |
| 7,792,752 B1 | 9/2010 | Kay |
| 7,792,753 B1 | 9/2010 | Slater et al. |
| 7,810,714 B2 | 10/2010 | Murata |
| 7,818,245 B2 | 10/2010 | Prakash et al. |
| 7,856,402 B1 | 12/2010 | Kay |
| 7,873,200 B1 * | 1/2011 | Oakes et al. ............... 382/137 |
| 7,876,949 B1 * | 1/2011 | Oakes et al. ............... 382/137 |
| 7,885,451 B1 * | 2/2011 | Walls et al. ................. 382/137 |
| 7,885,880 B1 | 2/2011 | Prasad et al. |
| 7,894,094 B2 | 2/2011 | Nacman et al. |
| 7,896,232 B1 | 3/2011 | Prasad et al. |
| 7,900,822 B1 | 3/2011 | Prasad et al. |
| 7,903,863 B2 | 3/2011 | Jones et al. |
| 7,904,386 B2 | 3/2011 | Kalra et al. |
| 7,912,785 B1 | 3/2011 | Kay |
| 7,949,587 B1 | 5/2011 | Morris et al. |
| 7,950,698 B2 | 5/2011 | Popadic et al. |
| 7,958,053 B2 * | 6/2011 | Stone .......................... 705/45 |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |
| 8,045,784 B2 | 10/2011 | Price et al. |
| 8,046,301 B1 | 10/2011 | Smith et al. |
| 8,204,293 B2 | 6/2012 | Csulits et al. |
| 8,235,284 B1 | 8/2012 | Prasad et al. |
| 8,320,657 B1 | 11/2012 | Burks et al. |
| 8,351,677 B1 * | 1/2013 | Oakes et al. ............... 382/137 |
| 8,392,332 B1 * | 3/2013 | Oakes et al. ............... 705/45 |
| 8,732,081 B1 * | 5/2014 | Oakes et al. ............... 705/43 |
| 2001/0004235 A1 | 6/2001 | Maloney |
| 2001/0014881 A1 | 8/2001 | Drummond |
| 2001/0018739 A1 | 8/2001 | Anderson |
| 2001/0027994 A1 | 10/2001 | Hayashida |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 | 11/2001 | Wesolkowski |
| 2001/0047330 A1 | 11/2001 | Gephart |
| 2001/0054020 A1 | 12/2001 | Barth et al. |
| 2002/0001393 A1 | 1/2002 | Jones |
| 2002/0016763 A1 | 2/2002 | March |
| 2002/0016769 A1 | 2/2002 | Barbara et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 * | 5/2002 | Martens et al. ............... 705/70 |
| 2002/0072974 A1 | 6/2002 | Pugliese |
| 2002/0075524 A1 | 6/2002 | Blair |
| 2002/0084321 A1 * | 7/2002 | Martens et al. ............... 235/379 |
| 2002/0087467 A1 | 7/2002 | Mascavage, III et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0129249 A1 | 9/2002 | Maillard et al. |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 * | 10/2002 | Dutta et al. ................ 705/43 |
| 2002/0152165 A1 | 10/2002 | Dutta et al. |
| 2002/0152169 A1 | 10/2002 | Dutta et al. |
| 2002/0159648 A1 | 10/2002 | Alderson et al. |
| 2002/0171820 A1 | 11/2002 | Okamura |
| 2002/0178112 A1 | 11/2002 | Goeller |
| 2002/0186881 A1 | 12/2002 | Li |
| 2002/0188564 A1 | 12/2002 | Star |
| 2002/0195485 A1 | 12/2002 | Pomerleau et al. |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown |
| 2003/0105714 A1 | 6/2003 | Alarcon-Luther et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0202690 A1 * | 10/2003 | Jones et al. ............... 382/139 |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0117302 A1 | 6/2004 | Weichert |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0033695 A1 | 2/2005 | Minowa |

(56) References Cited

U.S. PATENT DOCUMENTS

| | | |
|---|---|---|
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097019 A1 | 5/2005 | Jacobs |
| 2005/0097046 A1* | 5/2005 | Singfield ............ 705/42 |
| 2005/0097050 A1 | 5/2005 | Orcutt |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Anderson |
| 2005/0188306 A1 | 8/2005 | Mackenzie |
| 2005/0205661 A1 | 9/2005 | Taylor |
| 2005/0209961 A1 | 9/2005 | Michelsen |
| 2005/0228733 A1 | 10/2005 | Bent |
| 2005/0252955 A1 | 11/2005 | Sugai |
| 2005/0267843 A1* | 12/2005 | Acharya et al. ............ 705/42 |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeConte |
| 2005/0281474 A1 | 12/2005 | Huang |
| 2005/0289030 A1 | 12/2005 | Smith |
| 2005/0289182 A1 | 12/2005 | Pandian et al. |
| 2006/0002426 A1 | 1/2006 | Madour |
| 2006/0004660 A1 | 1/2006 | Pranger |
| 2006/0025697 A1 | 2/2006 | Kurzweil |
| 2006/0039628 A1 | 2/2006 | Li et al. |
| 2006/0039629 A1 | 2/2006 | Li |
| 2006/0041506 A1 | 2/2006 | Mason et al. |
| 2006/0045321 A1 | 3/2006 | Yu |
| 2006/0047593 A1 | 3/2006 | Naratil |
| 2006/0053056 A1 | 3/2006 | Alspach-Goss |
| 2006/0059085 A1 | 3/2006 | Tucker |
| 2006/0064368 A1 | 3/2006 | Forte |
| 2006/0080245 A1 | 4/2006 | Bahl |
| 2006/0085357 A1 | 4/2006 | Pizarro |
| 2006/0085516 A1 | 4/2006 | Farr et al. |
| 2006/0102704 A1 | 5/2006 | Reynders |
| 2006/0106691 A1 | 5/2006 | Sheaffer |
| 2006/0106717 A1 | 5/2006 | Randle |
| 2006/0108168 A1* | 5/2006 | Fischer et al. ............ 180/273 |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu et al. |
| 2006/0118613 A1 | 6/2006 | McMann |
| 2006/0124730 A1* | 6/2006 | Maloney ............ 235/379 |
| 2006/0144924 A1 | 7/2006 | Stover |
| 2006/0144950 A1 | 7/2006 | Johnson |
| 2006/0161501 A1 | 7/2006 | Waserstein |
| 2006/0164682 A1 | 7/2006 | Lev |
| 2006/0167818 A1 | 7/2006 | Wentker et al. |
| 2006/0182331 A1 | 8/2006 | Gilson et al. |
| 2006/0182332 A1* | 8/2006 | Weber ............ 382/139 |
| 2006/0186194 A1 | 8/2006 | Richardson et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0212391 A1 | 9/2006 | Norman et al. |
| 2006/0214940 A1 | 9/2006 | Kinoshita |
| 2006/0215204 A1 | 9/2006 | Miyamoto et al. |
| 2006/0215230 A1 | 9/2006 | Borrey et al. |
| 2006/0222260 A1 | 10/2006 | Sambongi et al. |
| 2006/0229976 A1 | 10/2006 | Jung |
| 2006/0229986 A1 | 10/2006 | Corder |
| 2006/0238503 A1 | 10/2006 | Smith |
| 2006/0242062 A1 | 10/2006 | Peterson |
| 2006/0242063 A1* | 10/2006 | Peterson et al. ............ 705/42 |
| 2006/0249567 A1* | 11/2006 | Byrne et al. ............ 235/379 |
| 2006/0274164 A1 | 12/2006 | Kimura et al. |
| 2006/0279628 A1 | 12/2006 | Fleming |
| 2006/0282383 A1 | 12/2006 | Doran |
| 2006/0291744 A1 | 12/2006 | Ikeda et al. |
| 2007/0016796 A1 | 1/2007 | Singhal |
| 2007/0019243 A1 | 1/2007 | Sato |
| 2007/0022053 A1 | 1/2007 | Waserstein |
| 2007/0027802 A1 | 2/2007 | VanDeburg et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth |
| 2007/0086643 A1 | 4/2007 | Spier et al. ............ 382/137 |
| 2007/0094088 A1 | 4/2007 | Mastie |
| 2007/0094140 A1 | 4/2007 | Riney et al. |
| 2007/0100748 A1 | 5/2007 | Dheer |
| 2007/0110277 A1 | 5/2007 | Hayduchok et al. |
| 2007/0118472 A1 | 5/2007 | Allen-Rouman et al. |
| 2007/0122024 A1 | 5/2007 | Haas et al. |
| 2007/0127805 A1 | 6/2007 | Foth et al. |
| 2007/0129955 A1 | 6/2007 | Dalmia |
| 2007/0136198 A1 | 6/2007 | Foth et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0156438 A1 | 7/2007 | Popadic |
| 2007/0168265 A1 | 7/2007 | Rosenberger |
| 2007/0171288 A1 | 7/2007 | Inoue |
| 2007/0172107 A1 | 7/2007 | Jones et al. |
| 2007/0172148 A1 | 7/2007 | Hawley |
| 2007/0179883 A1 | 8/2007 | Questembert |
| 2007/0183000 A1 | 8/2007 | Eisen et al. |
| 2007/0183741 A1 | 8/2007 | Lerman et al. |
| 2007/0194102 A1* | 8/2007 | Cohen et al. ............ 235/379 |
| 2007/0198432 A1 | 8/2007 | Pitroda et al. |
| 2007/0203708 A1 | 8/2007 | Polcyn et al. |
| 2007/0208816 A1 | 9/2007 | Baldwin et al. |
| 2007/0214086 A1* | 9/2007 | Homoki ............ 705/45 |
| 2007/0217669 A1* | 9/2007 | Swift et al. ............ 382/139 |
| 2007/0233585 A1 | 10/2007 | Ben Simon et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0246525 A1 | 10/2007 | Smith et al. |
| 2007/0251992 A1 | 11/2007 | Sharma et al. |

(56) References Cited

U.S. PATENT DOCUMENTS

| | | |
|---|---|---|
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0268540 A1 | 11/2007 | Gaspardo et al. |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1* | 12/2007 | Narayanan et al. ............ 705/45 |
| 2007/0295803 A1 | 12/2007 | Levine et al. |
| 2007/0299928 A1 | 12/2007 | Kohli et al. |
| 2008/0002911 A1 | 1/2008 | Eisen |
| 2008/0021802 A1 | 1/2008 | Pendelton |
| 2008/0040280 A1 | 2/2008 | Davis et al. |
| 2008/0052182 A1 | 2/2008 | Marshall |
| 2008/0059376 A1 | 3/2008 | Davis |
| 2008/0063253 A1 | 3/2008 | Wood |
| 2008/0068674 A1 | 3/2008 | McIntyre |
| 2008/0071721 A1 | 3/2008 | Wang |
| 2008/0073423 A1* | 3/2008 | Heit et al. .................... 235/379 |
| 2008/0080760 A1 | 4/2008 | Ronca |
| 2008/0086420 A1 | 4/2008 | Gilder et al. |
| 2008/0086421 A1 | 4/2008 | Gilder |
| 2008/0091599 A1 | 4/2008 | Foss, Jr. |
| 2008/0097899 A1 | 4/2008 | Jackson et al. |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |
| 2008/0116257 A1 | 5/2008 | Fickling |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0147549 A1 | 6/2008 | Rathbun |
| 2008/0156438 A1 | 7/2008 | Stumphauzer et al. |
| 2008/0162319 A1 | 7/2008 | Breeden et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0208727 A1 | 8/2008 | McLauqhlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder |
| 2008/0249951 A1 | 10/2008 | Gilder et al. |
| 2008/0262953 A1 | 10/2008 | Anderson |
| 2008/0275821 A1 | 11/2008 | Bishop et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0066987 A1 | 3/2009 | Inokuchi |
| 2009/0108080 A1 | 4/2009 | Meyer |
| 2009/0110281 A1 | 4/2009 | Hirabayashi |
| 2009/0141962 A1 | 6/2009 | Borgia et al. |
| 2009/0166406 A1 | 7/2009 | Pigg et al. |
| 2009/0167870 A1 | 7/2009 | Caleca et al. |
| 2009/0171819 A1 | 7/2009 | Emde et al. |
| 2009/0171825 A1 | 7/2009 | Roman |
| 2009/0173781 A1 | 7/2009 | Ramachandran |
| 2009/0185738 A1 | 7/2009 | Nepomniachtchi |
| 2009/0190823 A1 | 7/2009 | Walters |
| 2009/0192938 A1 | 7/2009 | Amos |
| 2009/0236413 A1 | 9/2009 | Mueller et al. |
| 2009/0252437 A1 | 10/2009 | Li |
| 2009/0254447 A1 | 10/2009 | Blades |
| 2009/0281904 A1 | 11/2009 | Pharris |
| 2009/0313167 A1 | 12/2009 | Dujari |
| 2010/0007899 A1 | 1/2010 | Lay |
| 2010/0027679 A1 | 2/2010 | Sunahara et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0082470 A1 | 4/2010 | Walach |
| 2010/0165015 A1 | 7/2010 | Barkley et al. |
| 2010/0226559 A1 | 9/2010 | Najari et al. |
| 2010/0260408 A1 | 10/2010 | Prakash et al. |
| 2010/0262522 A1 | 10/2010 | Anderson et al. |
| 2010/0312705 A1 | 12/2010 | Caruso et al. |
| 2011/0112967 A1 | 5/2011 | Anderson et al. |
| 2011/0310442 A1 | 12/2011 | Popadic et al. |
| 2013/0021651 A9 | 1/2013 | Popadic et al. |

OTHER PUBLICATIONS

Duvall, Mel, "Remote Deposit Capture", Baseline, vol. 1, issue 70, Mar. 2007, pp. 1-2.*

Affinity Credit Union, "Affinity announces online deposit", Aug 4, 2005, Affinity Federal Credit Union., p. 1.*

"Remote check deposit is the answer to a company's banking problem", Daily Breeze [Torrance, Calif], Nov. 17, 2006, pp. 1-2.*

"SNB Check Capture: SmartClient User's Guide", Nov. 2006, pp. 1-21.*

Wells Fargo—2005 News Releases, "The New WElls Fargo Electronic Deposit Services Break Through Banking Boundaries in the Age of Check 21", San Francisco, Mar. 28, 2005, Retrieved from the internet <https:www.wellsfargo.com/press/3282005_Check21?year=2005>.*

U.S. Appl. No. 11/320,998, filed Dec. 29, 2005, Luby et al.

U.S. Appl. No. 11/321,025, filed Dec. 29, 2005, Luby et al.

U.S. Appl. No. 11/321,027, filed Dec. 29, 2005, Luby et al.

U.S. Appl. No. 11/591,131, filed Oct. 31, 2006, Luby et al.

U.S. Appl. No. 11/591,014, filed Oct. 31, 2006, Oaks et al.

U.S. Appl. No. 11/590,971, filed Oct. 31, 2006, Oaks et al.

U.S. Appl. No. 11/591,247, filed Oct. 31, 2006, Oaks et al.

U.S. Appl. No. 11/590,963, filed Oct. 31, 2006, Oaks et al.

U.S. Appl. No. 11/591,025, filed Oct. 31, 2006, Oaks et al.

U.S. Appl. No. 11/591,003, filed Oct. 31, 2006, Oaks et al.

U.S. Appl. No. 11/591,974, filed Oct. 31, 2006, Oaks et al.

U.S. Appl. No. 11/591,273, filed Oct. 31, 2006, Walls et al.

U.S. Appl. No. 11/591,262, filed Oct. 31, 2006, Walls et al.

U.S. Appl. No. 11/591,227, filed Oct. 31, 2006, Walls et al.

U.S. Appl. No. 11/591,261, filed Oct. 31, 2006, Walls et al.

U.S. Appl. No. 11/590,998, filed Oct. 31, 2006, Walls et al.

U.S. Appl. No. 11/591,228, filed Oct. 31, 2006, Walls et al.

U.S. Appl. No. 11/591,320, filed Oct. 31, 2006, Walls et al.

Federal Check 21 Act, "New Check 21 Act Effective Oct. 28, 2004: Banks No Longer Will Return Original Cancelled Checks," Consumer Union's FAQ's and Congressional Testimony on Check 21, www.consumerlaw.org/initiatives/content/check21_content.html, downloaded Dec. 2005, 20 pages.

Fest, G., "Patently Unaware," *Bank Technology News*, Apr. 2006, http:banktechnews.com/article.html?id=20060403T7612618, 5 pages.

The Automated Clearinghouse, "Retail Payment Systems; Payment Instruments Clearing and Settlement; The Automated Clearinghouse (ACH)," www.ffiec.gov/ffiecinfobase/booklets/Retail/retail_02d.html, downloaded Dec. 2005, 3 pages.

Website: Blue Mountain Consulting, URL: www.blumountainconsulting.com, downloaded Apr. 26, 2006, 3 pages.

Website: RemoteDepositCapture.com, URL: www.RemoteDepositCapture.com, 2006, 5 pages.

United States Patent and Trademark Office: Non-Final Office Action dated Jan. 15, 2008, U.S. Appl. No. 11/686,930, 16 pages.

"Accept "Customer Not Present" Checks," Accept Check Online, http://checksoftware.com, Cited in patent No. 7,900,822, as dated 2007 (1 pg).

"Adjusting Brightness and Contrast", www.eaglesoftware.com/adjustin.htm, retrieved on May 4, 2009 (4 pgs).

"Best practices for producing quality digital image files," Digital Images Guidelines, http://deepblue.lib.umich.edu/bitstream/2027.42/40247/1/Images-Best_Practice.pdf, downloaded 2007 (2 pgs).

"Chapter 7 Payroll Programs," Uniform Staff Payroll System, http://www2.oecn.k12.oh.us/www/ssdt/usps/usps_user_guide_005.html, Cited in patent No. 7,900,822, as dated 2007 (9 pgs).

(56) References Cited

OTHER PUBLICATIONS

"Check 21—The check is not in the post", RedTitan Technology 2004 http://www.redtitan.com/check21/htm (3 pgs).
"Check 21 Solutions," Columbia Financial International, Inc. http://www.columbiafinancial.us/check2l/solutions.htm, Cited in patent No. 7,900,822, as dated 2007 (8 pgs).
"Check Fraud: A Guide to Avoiding Losses", All Net, http://all.net/books/audit/checkfraud/security.htm, Cited in patent No. 7,900,822, as dated 2007 (1 pg).
"Compliance with Regulation CC", http./www/federalreserve.gov/Pubs/regcc/regcc.htm, Jan. 24, 2006 (6 pgs).
"Customer Personalized Bank Checks and Address Labels" Checks Your Way Inc., http://www.checksyourway.com/htm/web_pages/faq.htm, Cited in patent No. 7,900,822, as dated 2007 (6 pgs).
"Direct Deposit Application for Payroll", Purdue University, Business Office Form 0003, http://purdue.edu/payroll/pdf/directdepositapplication.pdf, Jul. 2007 (2 pgs).
"Direct Deposit Authorization Form", www.umass.edu/humres/library/DDForm.pdf, May 2003 (3 pgs).
"Direct Deposit," University of Washington, http://www.washington.edu/admin/payroll/directdeposit.html, Cited in patent No. 7,900,822, as dated 2007 (3 pgs).
"Electronic Billing Problem: The E-check is in the mail" American Banker—vol. 168, No. 95, May 19, 2003 (4 pgs).
"Frequently Asked Questions" Bank of America, http://www/bankofamerica.com/deposits/checksave/index.cfm?template-lc_faq_bymail, Cited in patent No. 7,900,822, as dated 2007 (2 pgs).
"Full Service Direct Deposit", www.nonprofitstaffing.com/images/upload/dirdepform.pdf. Cited in patent No. 7,900,822, as dated 2001, (2 pgs).
"How to Digitally Deposit a Check Image", Smart Money Daily, Copyright 2008 (5 pgs).
"ImageNet Mobile Deposit Provides Convenient Check Deposit and Bill Pay to Mobile Consumers," Miteksystems, 2008 (2 pgs).
"It's the easiest way to Switch banks", LNB, http://www.inbky.com/pdf/LNBswitch-kit10-07.pdf Cited in patent No. 7,996,316, as dated 2007 (7 pgs).
"Lesson 38—More Bank Transactions", Turtle Soft, http://www.turtlesoft.com/goldenseal-software-manual.lesson38.htm, Cited in patent No. 7,900,822, as dated 2007 (8 pgs).
"Middleware", David E. Bakken, Encyclopedia of Distributed Computing, Kluwer Academic Press, 2001 (6 pgs).
"Mitek Systems Announces Mobile Deposit Application for Apple iPhone," http://prnewswire.com/cgi-bin/stories/pl?ACCT=104&STORY=/www/story/10-01-. . . , Nov. 25, 2008 (2 pgs).
"Personal Finance", PNC, http://www.pnc.com/webapp/unsec/productsandservice.do?sitearea=/PNC/home/personal/account+services/quick+switch/quick+switch+faqs, Cited in patent No. 7,900,822, as dated 2007 (12 pgs).
"Refractive index" Wikipedia, the free encyclopedia; http://en.wikipedia.org./wiki/refractiveindex.com Oct. 16, 2007 (4 pgs).
"Remote Deposit Capture", Plante & Moran, http://plantemoran.com/industries/fincial/institutions/bank/resources/community+bank+advisor/2007+summer+issue/remote+deposit+capture.htm, Cited in patent No. 7,900,822, as dated 2007 (3 pgs).
"Remote Deposit" National City, http://www.nationalcity.com/smallbusiness/cashmanagement/remotedeposit/default.asp; Cited in patent No. 7,900,822, as dated 2007 (1 pg).
"Save on ATM Fees", RedEye Edition, Chicago Tribune, Chicago, IL Jun. 30, 2007 (2 pgs).
"Switching Made Easy," Bank of North Georgia, http://www.banknorthgeorgia.com/cmsmaster/documents/286/documents616.pdf, 2007 (7 pgs).
"Two Words Every Business Should Know: Remote Deposit," Canon, http://www.rpsolutions.com/rpweb/pdfs/canon_rdc.pdf, 2005 (7 pgs).
"Virtual Bank Checks", Morebusiness.com, http://www.morebusiness.com/running_your business/businessbits/d908484987.brc, Cited in patent No. 7,900,822, as dated 2007 (3 pgs).

"WallStreetGrapevine.com" Stocks on the Rise: JADG, BKYI, MITK; Mar. 3, 2008 (4 pgs).
"What is check Fraud", National Check Fraud Center, http://www.ckfraud.org/ckfraud.html , Cited in patent No. 7,900,822, as dated 2007 (12 pgs).
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993 (6 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Amber Avalona-Butler / Paraglide, "At Your Service: Best iPhone Apps for Military Lifestyle," Jul. 9, 2010 (2 pgs).
Anderson, Milton M. "FSML and Echeck", Financial Services Technology Consortium, 1999 (17 pgs).
Archive Index Systems; Panini My Vision X-30 or VX30 or X30 © 1994-2008 Archive Systems, Inc. P./O. Box 40135 Bellevue, WA USA 98015 (2 pgs).
Associate of German Banks, SEPA 2008: Uniform Payment Instruments for Europe, Berlin, Cited in patent No. 7,900,822, as dated Jul. 2007, Bundesverbankd deutscher banker ev (42 pgs).
Automated Merchant Systems, Inc., "Electronic Check Conversion," http://www.automatedmerchant.com/electronic_check_conversion.cfm, 2006, downloaded Oct. 18, 2006 (3 pgs).
Bank Systems & Technology, Untitled Article, May 1, 2006, http://www.banktech.com/showarticle.jhtml? articleID=187003126, "Are you Winning in the Payment World?" (4 pgs).
BankServ, "DepositNow: What's the difference?" Cited in patent No. 7,970,677, as dated 2006, (4 pgs).
BankServ, Product Overview, http://www.bankserv.com/products/remotedeposit.htm, Cited in patent No. 7,970,677, as dated 2006, (3 pgs).
Blafore, Bonnie "Lower Commissions, Fewer Amenities", Better Investing, Madison Heights: Feb. 2003, vol. 52, Iss 6, (4 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).
Board of Governors of the federal reserve system, "Report to the Congress on the Check Clearing for the 21$^{st}$ Century Act of 2003" Apr. 2007, Submitted to Congress pursuant to section 16 of the Check Clearing for the 21$^{st}$ Century Act of 2003, (59 pgs).
Bruene, Jim; "Check Free to Enable In-Home Remote Check Deposit for Consumers and Small Business", NetBanker. Com, Financial Insite, Inc., http://www. netbanker.com/2008/02/checkfree_to_enableinhome_rem.html, Feb. 5, 2008 (3 pgs).
Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).
Bruno, M., "Instant Messaging," Bank Technology News, Dec. 2002 (3 pgs).
Burnett, J. "Depository Bank Endorsement Requirements," BankersOnline.com, http://www.bankersonline.com/cgi-bin/printview/printview.pl, Jan. 6, 2003 (3 pgs).
Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007. (4 pgs).
Carrubba, P. et al., "Remote Deposit Capture: A White Paper Addressing Regulatory, Operational and Risk Issues," NetDeposit Inc., 2006 (11 pgs).
Century Remote Deposit High-Speed Scanner User's Manual Release 2006, (Century Manual), Century Bank, 2006, (32 pgs).
Chiang, Chuck, The Bulletin, "Remote banking offered", http://bendbulletin.com/apps/pbcs.dll/article?AID=/20060201/BIZ0102/602010327&templ . . . , May 23, 2008 (2 pgs).
CNN.com/technology, "Scan, deposit checks from home", www.cnn.com/2008ITECH/biztech/02/07/check.scanning.ap/index.html, Feb. 7, 2008 (3 pgs).

(56) References Cited

OTHER PUBLICATIONS

Constanzo, Chris, "Remote Check Deposit: Wells Captures a New Checking Twist", Bank Technology News Article—May 2005, www.americanbankercom/btn_article.html?id=20050502YQ5OFSYG (2 pgs).
Craig, Ben, "Resisting Electronic Payment Systems: Burning Down the House?", Federal Reserve Bank of Cleveland, Jul. 1999 (4 pgs).
Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).
Credit Union Journal, "The Ramifications of Remote Deposit Capture Success", www.cuiournal.com/orintthis.html?id=20080411EODZT57G, Apr. 14, 2008 (1 pg).
Credit Union Journal, "AFCU Averaging 80 DepositHome Transactions Per Day", Credit Union Journal, Aug. 15, 2005 (1 pg).
DCU Member's Monthly—Jan. 2008, "PC Deposit—Deposit Checks from Home!", http://www.mycreditunionnewsletter.com/dcu/0108/page1.html, Copyright 2008 Digital Federal Credit Union (2 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
De Queiroz, Ricardo et al., "Mixed Raster Content (MRC) Model for Compound Image Compression", 1998 (14 pgs).
Debello, James et al., "RDM and Mitek Systems to Provide Mobile Check Deposit," Mitek Systems, Inc., San Diego, California and Waterloo, Ontario, (Feb. 24, 2009), 2 pgs.
DeYoung, Robert; "The Financial Performance of Pure Play Internet Banks"; Federal Reserve Bank of Chicago Economic Perspectives; 2001; pp. 60-75; vol. 25, No. 1 (16pgs).
Dias, Danilo et al., "A Model for the Electronic Representation of Bank Checks", Brasilia Univ. Oct. 2006 (5 pgs).
Digital Transactions News, "An ACH-Image Proposal for Check Roils Banks and Networks" May 26, 2006 (3 pgs).
Dinan, R.F. et al., "Image Plus High Performance Transaction System", IBM Systems Journal, 1990 vol. 29, No. 3 (14 pgs).
eCU Technologies, "Upost Remote Deposit Solution," Retrieved from the internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Reserve Board, "Check Clearing for the 21st Century Act", FRB, http://www.federalreserve.gov/paymentsystems/truncation/, Mar. 1, 2006 (1 pg).
Federal Reserve System, "12 CFR, Part 229 [Regulation CC]: Availability of Funds and Collection of Checks," Federal Registrar, Apr. 28, 1997, pp. 1-50.
Federal Reserve System, "Part IV, 12 CFR Part 229 [Regulation CC]: Availability of Funds and Collection of Checks; Final Rule," Federal Registrar, vol. 69, No. 149, Aug. 4, 2004, pp. 47290-47328.
Fidelity Information Services, "Strategic Vision Embraces Major Changes in Financial Services Solutions: Fidelity's long-term product strategy ushers in new era of application design and processing," Insight, 2004, pp. 1-14.
Fisher, Dan M., "Home Banking in the 21st Century: Remote Capture Has Gone Retail", May 2008 (4 pgs).
Furst, Karen et al., "Internet Banking: Developments and Prospects", Economic and Policy Analysis Working Paper 2000-9, Sep. 2000 (60 pgs).
Garry, M., "Checking Options: Retailers face an evolving landscape for electronic check processing that will require them to choose among several scenarios," Supermarket News, vol. 53, No. 49, 2005 (3 pgs).

German Shegalov, Diplom-Informatiker, "Integrated Data, Message, and Process Recovery for Failure Masking in Web Services", Dissertation Jul. 2005 (146 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Gupta, Maya R. et al., "OCR binarization and image pre-processing for searching historical documents," Pattern Recognition, vol. 40, No. 2, Feb. 2007, pp. 389-397.
Hale, J., "Picture this: Check 21 uses digital technology to speed check processing and shorten lag time," Columbus Business First, http://columbus.bizjournals.com/columbus/stories/2005/03/14focus1html, downloaded 2007 (3 pgs).
Hartly, Thomas, "Banks Check Out New Image", Business First, Buffalo: Jul. 19, 2004, vol. 20, Issue 43, (3 pgs).
Heckenberg, D. "Using Mac OS X for Real-Time Image Processing" Oct. 8, 2003 (15 pgs).
Hildebrand, C. et al., "Electronic Money," Oracle, http://www.oracle.com/oramag/profit/05-feb/p15financial.html, 2005, downloaded Oct. 18, 2006 (5 pgs).
Hillebrand, G., "Questions and Answers About the Check Clearing for the 21st Century Act, Check 21," ConsumersUnion.org, http://www.consumersunion.org/finance/ckclear1002.htm, Jul. 27, 2004, downloaded Oct. 18, 2006 (6 pgs).
Image Master, "Photo Restoration: We specialize in digital photo restoration and photograph repair of family pictures", http://www.imphotorepair.com, Cited in patent No. 7,900,822, as downloaded Apr. 2007 (1 pg).
Investment Systems Company, "Portfolio Accounting System," 2000, pp. 1-32.
JBC, "What is a MICR Line?," eHow.com, retrieved from http://www.ehow.com/about_4684793_what-micr-line.html on May 4, 2009 (2 pgs).
Johnson, Jennifer J., Secretary of the Board; Federal Reserve System, 12 CFR Part 229, Regulation CC, "Availability of Funds and Collection of Checks". Cited in patent No. 7,900,822, as dated 2009, (89 pgs).
Kendrick, Kevin B., "Check Kiting, Float for Purposes of Profit," Bank Security & Fraud Prevention, vol. 1, No. 2, 1994 (3 pgs).
Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).
Knestout, Brian P. et al., "Banking Made Easy" Kiplinger's Personal Finance Washington, Jul. 2003, vol. 57, Iss 7 (5 pgs).
Kornai Andras et al., "Recognition of Cursive Writing on Personal Checks", Proceedings of International Workshop on the Frontiers in Handwritting Recognition, Cited in patent No. 7,900,822, as dated Sep. 1996, (6 pgs).
Levitin, Adam J., Remote Deposit Capture: A Legal and Transactional Overview, Banking Law Journal, p. 115, 2009 (RDC).
Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).
Matthews, Deborah, "Advanced Technology Makes Remote Deposit Capture Less Risky," Indiana Bankers Association, Apr. 2008 (2 pgs).
Metro 1 Credit Union, "Remote Banking Services," hltp://ww\\i.metro1cu.org/metro1cu/remote.html, downloaded Apr. 17, 2007 (4 pgs).
Mitek systems, "Imagenet Mobile Deposit", San Diego, CA, downloaded 2009 (2 pgs).
Mitek Systems: Mitek Systems Launches First Mobile Check Deposit and Bill Pay Application, San Diego, CA, Jan. 22, 2008 (3 pgs).
Mohl, Bruce, "Banks Reimbursing ATM Fee to Compete With Larger Rivals", Boston Globe, Boston, MA, Sep. 19, 2004 (3 pgs).
Moreau, T., "Payment by Authenticated Facsimile Transmission: a Check Replacement Technology for Small and Medium Enterprises," Connotech Experts-conseils, Inc., Apr. 1995 (31 pgs).
Nelson, B. et al., "Remote deposit capture changes the retail landscape,"Northwestern Financial Review, http://findarticles.com/p/articles/mi qa3799/is 200607/ai_n16537250, 2006 (3 pgs).

(56) References Cited

OTHER PUBLICATIONS

NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fiserv Research Finds Banks are Interested in Offering Mobile Deposit Capture as an," Fiserv, Inc. Brookfield, Wis., (Business Wire), (Feb. 20, 2009), 2 pgs.
Online Deposit: Frequently Asked Questions, http://www.depositnow.com/faq.html, Copyright 2008 (1 pg).
Onlinecheck.com/Merchant Advisors, "Real-Time Check Debit", Merchant Advisors: Retail Check Processing Check Conversion, http://www.onlinecheck/wach/rcareal.htrn, Cited in patent No. 7,900,822, as dated 2006 (3 pgs).
Oxley, Michael G., from committee on Financial Services; "Check Clearing for the 21$^{st}$ Century Act", 108$^{th}$ Congress, 1$^{st}$ Session House of Representatives report 108-132, Jun. 2003 (20 pgs).
Oxley, Michael G., from the committee of conference; "Check Clearing for the 21$^{st}$ Century Act" 108$^{th}$ Congress, 1$^{st}$ Session Senate report 108-291, Oct. 1, 2003 (27 pgs).
Palacios, Rafael et al., "Automatic Processing of Brazilian Bank Checks". Cited in patent No. 7,900,822, as dated 2002 (28 pgs).
Patterson, Scott "USAA Deposit@Home—Another WOW moment for Net Banking", NextCU.com, Jan. 26, 2007 (5 pgs).
Public Law 108-100, 108 Congress; "An Act Check Clearing for the 21$^{st}$ Century Act", Oct. 28, 2003, 117 STAT. 1177 (18 pgs).
Rao, Bharat; "The Internet and the Revolution in Distribution: A Cross-Industry Examination"; Technology in Society; 1999; pp. 287-306; vol. 21, No. 3 (20 pgs).
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
RemoteDepositCapture.com, Remote Deposit Capture News Articles from Jul. 6, 2006, "BankSery Announces New Remote Deposit Product Integrated with QuickBooks" (3 pgs).
Remotedepsitcapture.com, LLC, "Remote Deposit Capture Overview," ROC Overview, http://remotedepositcapture.com/overview/RDC_overview.htm, Cited in patent No. 7,900,822, as dated Mar. 12, 2007 (4 pgs).
Richey, J. C. et al., "EE 4530 Check Imaging," Nov. 18, 2008 (10 pgs).
Ritzer, J.R. "Hinky Dinky helped spearhead POS, remote banking movement", Bank Systems and Equipment, vol. 21, No. 12, Dec. 1984 (1 pg).
Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).
Rose, Sarah et al., "Best of the We: The Top 50 Financial Websites", Money, New York, Dec. 1999, vol. 28, Iss. 12 (8 pgs).
Shelby, Hon. Richard C. (Committee on Banking, Housing and Urban Affairs); "Check Truncation Act of 2003", calendar No. 168, 108$^{th}$ Congress, 1$^{st}$ Session Senate report 108-79, Jun. 2003 (27 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html (2 pgs).
The Green Sheet 2.0: Newswire, "CO-OP adds home deposit capabilities to suite of check imaging products", www.greensheet.com/newswire.php?newswire_id=8799, Mar. 5, 2008 (2 pgs).
Tygar, J.D., Atomicity in Electronic Commerce, in ACM Networker, 2:2, Apr./May 1998 (12 pgs).
Valentine, Lisa, "Remote Deposit Capture Hot Just Got Hotter," ABA Banking Journal, Mar. 2006, p. 1-9.
Wade, Will, "Early Notes: Updating Consumers on Check 21" American Banker Aug. 10, 2004 (3 pgs).
Wallison, Peter J., "Wal-Mart Case Exposes Flaws in Banking-Commerce Split", American Banker, vol. 167. No. 8, Jan. 11, 2002 (3 pgs).
Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).
Wells Fargo Commercial, "Remote Deposit", www.wellsfargo.com/com/treasury mgmtlreceivables/electronic/remote deposit, Copyright 2008 (1 pg).
White, J.M. et al., "Image Thresholding for Optical Character Recognition and Other Applications Requiring Character Image Extraction", IBM J. Res. Development, Jul. 1983, vol. 27, No. 4 (12 pgs).
Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733- BE417C638618/35930/DSTUFormat.pdf (2 pages).
Wikipedia®, "Remote Deposit," http://en.wikipedia.org/wiki/Remote_deposit, 2007 (3 pgs).
Windowsfordevices.com, "Software lets camera phone users deposit checks, pay bills", www.windowsfordevices.com/news/NS3934956670.html, Jan. 29, 2008 (3 pgs).
Wolfe, Daniel, "Check Image Group Outlines Agenda," American Banker, New York, N.Y.: Feb. 13, 2009, vol. 174, Iss. 30, p. 12. (2 pgs).
Woody Baird Associated Press, "Pastor's Wife got Scammed—She Apparently Fell for Overseas Money Scheme," The Commercial Appeal, Jul. 1, 2006, p. A. 1.
Zhang, C.Y., "Robust Estimation and Image Combining" Astronomical Data Analysis Software and Systems IV, ASP Conference Series, 1995 (5 pgs).
Zions Bancorporation, "Moneytech, the technology of money in our world: Remote Deposit," http://www.bankjunior.com/pground/moneytech/remote_deposit.jsp, 2007 (2 pgs).
U.S. Appl. No. 12/062,143, filed Apr. 3, 2008 (27 pgs).
U.S. Appl. No. 12/859,741, filed Aug. 19, 2010 (235 pgs).
U.S. Appl. No. 12/195,723, filed Aug. 21, 2008 (38 pgs).
U.S. Appl. No. 12/545,127, filed Aug. 21, 2009 (45 pgs).
U.S. Appl. No. 12/549,443, filed Aug. 28, 2009 (41 pgs).
U.S. Appl. No. 11/613,656, filed Dec. 20, 2006 (21 pgs).
U.S. Appl. No. 12/982,494, filed Dec. 30, 2010 (280 pgs).
U.S. Appl. No. 12/982,561, filed Dec. 30, 2010 (275 pgs).
U.S. Appl. No. 12/982,578, filed Dec. 30, 2010 (274 pgs).
U.S. Appl. No. 12/982,594, filed Dec. 30, 2010 (275 pgs).
U.S. Appl. No. 12/388,005, filed Feb. 18, 2009 (37 pgs).
U.S. Appl. No. 11/487,537, filed Jul. 13, 2006 (23 pgs).
U.S. Appl. No. 12/509,613, filed Jul. 27, 2009 (48 pgs).
U.S. Appl. No. 12/509,680, filed Jul. 27, 2009 (41 pgs).
U.S. Appl. No. 12/137,051, filed Jun. 11, 2008 (29 pgs).
U.S. Appl. No. 13/155,976, filed Jun. 8, 2011 (352 pgs).
U.S. Appl. No. 13/156,007, filed Jun. 8, 2011 (356 pgs).
U.S. Appl. No. 13/156,018, filed Jun. 8, 2011 (353 pgs).
U.S. Appl. No. 11/686,924, filed Mar. 15, 2007 (34 pgs).
U.S. Appl. No. 11/686,928, filed Mar. 15, 2007 (36 pgs).
U.S. Appl. No. 12/397,671, filed Mar. 4, 2009 (40 pgs).
U.S. Appl. No. 12/397,930, filed Mar. 4, 2009 (37 pgs).
U.S. Appl. No. 11/747,222, filed May 10, 2007 (35 pgs).
U.S. Appl. No. 12/253,278, filed Oct. 17, 2008 (42 pgs).
U.S. Appl. No. 11/876,925, filed Oct. 23, 2007 (36 pgs).
U.S. Appl. No. 11/877,335, filed Oct. 23, 2007 (29 pgs).
U.S. Appl. No. 11/923,839, filed Oct. 25, 2007 (22 pgs).
U.S. Appl. No. 11/926,388, filed Oct. 29, 2007 (23 pgs).
U.S. Appl. No. 11/928,297, filed Oct. 30, 2007 (26 pgs).
U.S. Appl. No. 11/590,974, filed Oct. 31, 2006 (31 pgs).
U.S. Appl. No. 11/591,008, filed Oct. 31, 2006 (27 pgs).
U.S. Appl. No. 11/591,227, filed Oct. 31, 2006 (58 pgs).
U.S. Appl. No. 11/591,273, filed Oct. 31, 2006 (56 pgs).
U.S. Appl. No. 11/930,537, filed Oct. 31, 2007 (27 pgs).
U.S. Appl. No. 11/931,670, filed Oct. 31, 2007 (47 pgs).
U.S. Appl. No. 11/868,884, filed Oct. 8, 2007 (30 pgs).
U.S. Appl. No. 11/864,569, filed Sep. 28, 2007 (35 pgs).
U.S. Appl. No. 12/205,996, filed Sep. 8, 2008 (30 pgs).
Claims as filed on Apr. 3, 2008 for U.S. Appl. No. 12/062,163 (3 pgs).
Claims as filed Apr. 3, 2008 for U.S. Appl. No. 12/062,175 (3 pgs).

(56) References Cited

OTHER PUBLICATIONS

Claims as filed Aug. 19, 2010 for U.S. Appl. No. 12/859,752 (5 pgs).
Claims as filed Dec. 15, 2011 for U.S. Appl. No. 13/327,478 (4 pgs).
Claims as filed Dec. 20, 2006 for U.S. Appl. No. 11/613,671 (3 pgs).
Claims as filed Dec. 8, 2010 for U.S. Appl. No. 12/963,513 (7 pgs).
Claims as filed Feb. 16, 2011 for U.S. Appl. No. 13/028,477 (3 pgs).
Claims as filed Jan. 20, 2011 for U.S. Appl. No. 13/010,644 (9 pgs).
Claims as filed Jan. 31, 2011 for U.S. Appl. No. 13/017,865 (11 pgs).
Claims as filed Mar. 15, 2007 for U.S. Appl. No. 11/686,925 (5 pgs).
Claims as filed May 10, 2007 for U.S. Appl. No. 11/747,223 (4 pgs).
Claims as filed May 18, 2011 for U.S. Appl. No. 13/110,077 (9 pgs).
Claims as filed May 2, 2011 for U.S. Appl. No. 13/098,566 (10 pgs).
Claims as filed Oct. 23, 2007 for U.S. Appl. No. 11/877,382 (6 pgs).
Claims as filed Oct. 24, 2008 for U.S. Appl. No. 12/257,471 (4 pgs).
Claims as filed Oct. 31, 2006 for U.S. Appl. No. 11/590,963 (3 pgs).
Claims as filed Oct. 31, 2006 for U.S. Appl. No. 11/590,995 (3 pgs).
Claims as filed Oct. 31, 2006 for U.S. Appl. No. 11/590,998 (4 pgs).
Claims as filed Oct. 31, 2007 for U.S. Appl. No. 11/931,804 (4 pgs).
Claims as filed Oct. 8, 2007 for U.S. Appl. No. 11/868,878 (4 pgs).
Claims as filed Sep. 2, 2008 for U.S. Appl. No. 12/202,781 (4 pgs).
Claims as filed Sep. 8, 2008 for U.S. Appl. No. 12/206,001 (3 pgs).
Claims as filed Sep. 8, 2008 for U.S. Appl. No. 12/206,007 (3 pgs).
Final Office Action from corresponding U.S. Appl. No. 11/686,930 dated Jun. 20, 2008 (13 pages).
Office Action from corresponding U.S. Appl. No. 11/686,930 dated Dec. 30, 2008 (14 pages).
Final Office Action from corresponding U.S. Appl. No. 11/686,930 dated Jun. 17, 2009 (16 pages).
Office Action from corresponding U.S. Appl. No. 11/686,930 dated Dec. 23, 2009 (22 pages).
Final Office Action from corresponding U.S. Appl. No. 11/686,930 dated Aug. 27, 2010 (21 pages).
Office Action from corresponding U.S. Appl. No. 11/686,930 dated Mar. 1, 2011 (23 pages).
Final Office Action from corresponding U.S. Appl. No. 11/686,930 dated Aug. 16, 2011 (20 pages).
Office Action from corresponding U.S. Appl. No. 11/686,922 dated Feb. 3, 2009 (10 pages).
Office Action from corresponding U.S. Appl. No. 11/686,922 dated Aug. 31, 2009 (10 pages).
Office Action from corresponding U.S. Appl. No. 11/686,922 dated Mar. 12, 2010 (9 pages).
Office Action from corresponding U.S. Appl. No. 11/686,922 dated Sep. 22, 2010 (10 pages).
Office Action from corresponding U.S. Appl. No. 11/686,922 dated Sep. 6, 2011 (18 pages).
U.S. Appl. No. 13/721,945, filed Dec. 20, 2012 (55 pgs).
U.S. Appln No. 13/722,303, filed Dec. 20, 2012 (32 pgs).
U.S. Appl. No. 13/397,405, filed Feb. 15, 2012 (19 pgs).
U.S. Appl. No. 13/780,946, filed Feb. 28, 2013 (55 pgs).
U.S. Appl. No. 13/742,909, filed Jan. 16, 2013 (31 pgs).
U.S. Appl. 13/735,678, filed Jan. 7, 2013 (30 pgs).
U.S. Appl. No. 13/833,182, filed Mar. 15, 2013 (74 pgs).
U.S. Appl. No. 13/834,353, filed Mar. 15, 2013 (37 pgs).
U.S. Appl. No. 13/837,883, filed Mar. 15, 2013 (28 pgs).
U.S. Appl. No. 13/840,761, filed Mar. 15, 2013 (56 pgs).
U.S. Appl. No. 13/842,112 filed, Mar. 15, 2013 (62 pgs).
U.S. Appl. No. 13/656,164, filed Oct. 19, 2012 (32 pgs).
U.S. Appl. No. 13/619,405, filed Sep. 14, 2012 (30 pgs).
Claims as filed Dec. 20, 2012 for U.S. Appl. No. 13/722,576 (4 pgs).
Claims as filed Dec. 20, 2012 for U.S. Appl. No. 13/722,602 (4 pgs).
Claims as filed Dec. 29, 2005 for U.S. Appl. No. 11/320,998 (3 pgs).
Claims as filed Dec. 29, 2005 for U.S. Appl. No. 11/321,027 (3 pgs).
Claims as filed Feb. 12, 2013 for U.S. Appl. No. 13/765,412 (1 pg).
Claims as filed Feb. 15, 2012 for U.S. Appl. No. 13/397,437 (6 pgs).
Claims as filed Feb. 19, 2013 for U.S. Appl. No. 13/770,048 (4 pgs).
Claims as filed Nov. 20, 2012 for U.S. Appl. No. 13/682,268 (4 pgs).
Claims as filed Sep. 14, 2012 for U.S. Appl. No. 13/619,026 (3 pgs).

\* cited by examiner

SYSTEMS AND METHODS FOR VERIFICATION OF REMOTELY DEPOSITED CHECKS

CROSS-REFERENCE TO RELATED APPLICATIONS

This application is related by subject matter to U.S. patent application Ser. No. 11/686,930, filed Mar. 15, 2007, and U.S. patent application Ser. No. 11/686,922, filed Mar. 15, 2007.

BACKGROUND

As described in U.S. patent application Ser. No. 11/321,025, checks typically provide a safe and convenient method for an individual to purchase goods and/or services. To use a check, the individual usually must open a checking account, or other similar account, at a financial institution and deposit funds, which are then available for later withdrawal. To pay for goods and/or services with a check, the payor (i.e., the buyer) usually designates a payee (i.e., the seller) and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account at a payor bank on behalf of the payee in return for the goods and/or services provided by the payee.

Checks have certain advantages over other forms of payment, such as cash. For example, while often considered the most liquid type of asset, cash also may be the least secure. Unlike a check, cash is usually freely transferable and does not have to be endorsed. Thus, the owner and possessor of cash is most often the same individual. Because cash is freely transferable, cash that is lost or stolen typically cannot be recovered. Therefore, the risks associated with cash transactions are often unacceptable, particularly with respect to transactions not conducted in person (e.g., by mail) and/or involving large sums of money. A check, on the other hand, provides a payor with more security because the check usually requires a payor to specify both the person and amount to be paid. Furthermore, as noted above, the check is usually not valid until it is properly signed by the payor. These safeguards help to reduce the risk that money will be lost and/or stolen and ensure that the proper payee receives the proper amount of money.

Cash may have other disadvantages as well. For example, because cash is freely transferable, there may be little or no verifiable transaction history. It is often desirable for a payor and/or payee to have physical proof that a particular transaction took place. This typically requires that the payor receive a receipt. However, receipts may contain errors and can be easily misplaced. In contrast, a bank processing a check will ordinarily create a transaction history, which may include the identity of the payee, the amount to be paid, the date of the payment, and the signature of the payor. This enables both a payor and payee to independently verify the accuracy of most transactions involving a payment by check.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller. In addition to the time commitment that may be required, visiting a bank branch may be problematic for the payee if the bank's hours of operation coincide with the payee's normal hours of employment. Thus, the payee may be required to leave work early and/or change work schedules.

A check may pose other burdens for the payee. As noted above, a check may not be freely transferable, thereby limiting the payee's ability to use funds from the check. For example, it is usually difficult to for the payee to purchase goods and/or services using a check issued by the payor. While the check may be endorsed and accepted by a third party, such transactions are often disfavored because the third party may not know the payor and, thus, may not be willing to accept the risk that the payor has insufficient funds to cover the check. Therefore, the payee may not have access to the funds from the check until the payee deposits the check at the bank, the check has cleared and the funds have been credited to the payee's account. The payee may have to wait even longer if the payee chooses to deposit the check by mail.

Systems and methods for remotely depositing checks can advantageously address a variety of the above listed burdens on the payee, and thereby promote the use of checks and the various advantages attached thereto. A variety of high-speed, special purpose check deposit systems for commercial use are available on the market today. Also, as described in U.S. patent application Ser. No. 11/321,025 and U.S. patent application Ser. No. 11/591,014, future systems may emerge allowing individuals to remotely deposit checks using, for example, a customer controlled home telephone or customer controlled general purpose consumer. Such remote deposit systems may prove advantageous for banks and bank customers alike, in part because they are adapted for today's mobile lifestyles experienced by individuals in military, government, and private sector careers, and in part because they successfully leverage electronic communications advances allowing unprecedented automation, speed, and security in deposit transactions.

However, satisfactory systems for verifying check validity in such systems for remote deposit have so far remained out of reach. Sufficient automation is required for efficient processing of hundreds, even thousands or more remotely deposited checks per day as may be received by a large financial institution. Efficiency and speed must be accomplished without sacrificing accuracy, however, and without opening opportunities for fraud. Therefore, there is a need in the industry for automated approaches to verify the validity of remotely deposited checks.

SUMMARY

The described embodiments contemplate a system, method and computer-readable medium with computer-executable instructions for verifying validity of remotely deposited checks in a system for electronically receiving check images from customers, said check images corresponding to at least one payor check, and for automatically initiating a deposit of funds associated with said payor check into a customer account.

In a first embodiment, the novel method may be directed to detecting the presence of signatures on a received check image. Upon electronically receiving an image of a front side of a payor check and/or a back side of said payor check, an electronic analysis may be automatically performed to determine whether a payor signature is present on the front side of said payor check and whether an endorsement signature is present the a back side of said payor check. The electronic analysis my go further by comparing the detected signatures to signature verification files and performing a variety of other operations as disclosed herein.

In another embodiment, the novel method may include a "face recognition" process that may be performed on an image of a deposited check to verify its authenticity. Upon electronically receiving an image of a payor check, at least a portion of said image can be automatically electronically compared to a payor check verification image, or some other data that specifies with sufficient accuracy the desired properties of a valid check from the payor or a class of payors including a payor in question.

In still another embodiment, a check Magnetic Ink Character Recognition (MICR) line may be inspected for indications that a check is no longer valid. Upon electronically receiving an image of a payor check, a MICR line portion of said image can be automatically electronically analyzed to determine if said MICR line comprises at least one predetermined feature, and if so, an appropriate action can be taken such as terminating the deposit transaction and notifying a customer that the check will not be deposited.

Additional advantages and features of the invention are described below.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

In general, it is contemplated that the various systems, methods, and computer readable media disclosed herein will be implemented within a system for processing remote deposit of checks. Such a system will generally include subsystems for electronically receiving check images from customers, said check images corresponding to at least one payor check, and for automatically initiating a deposit of funds associated with said payor check into a customer account. Such a system may also beneficially automatically initiate a process for clearing the payor check with a payor bank.

Figure 1:
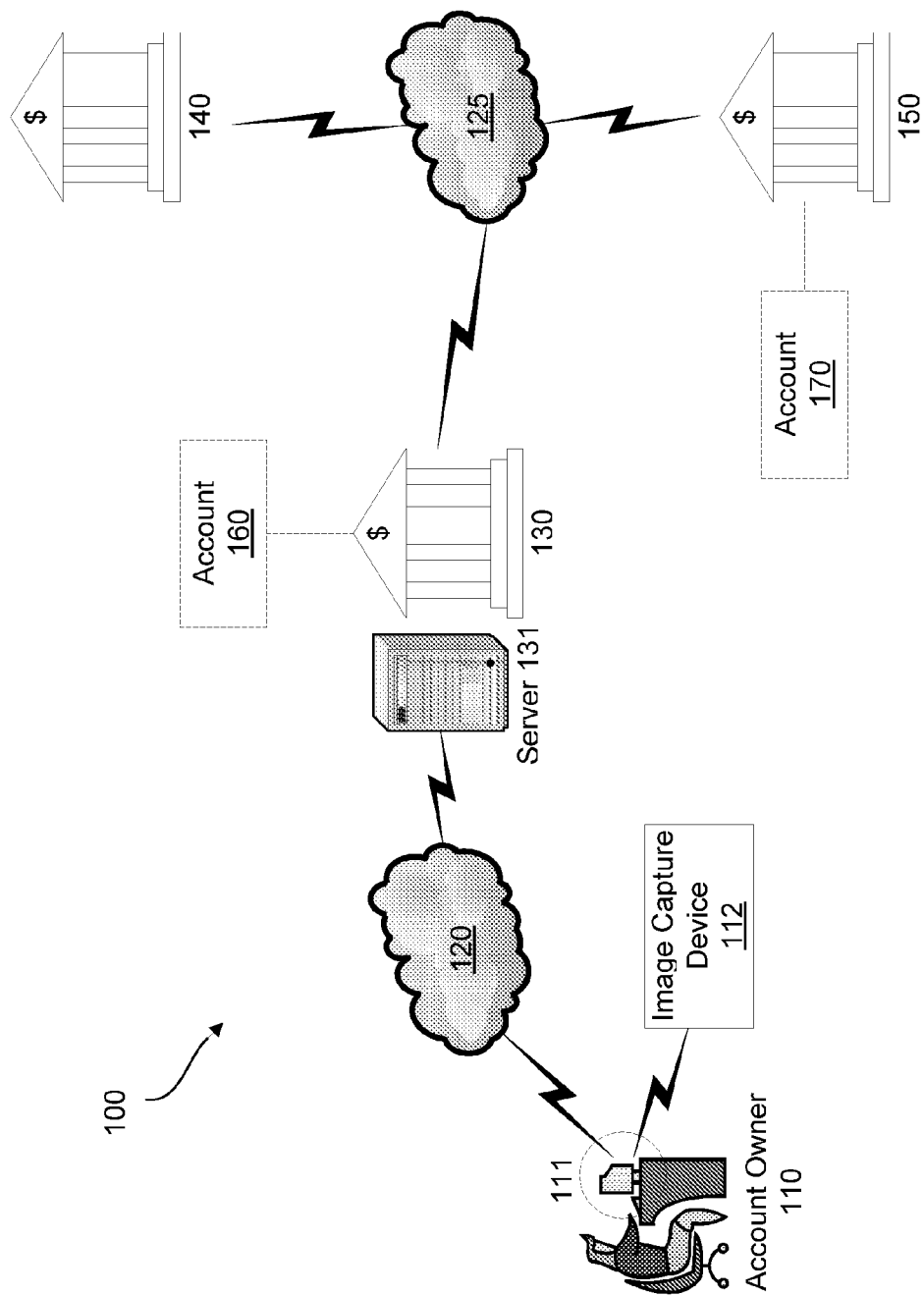
FIG. 1 illustrates a broad view of a system in which the described embodiments may be employed.
Figure 2:
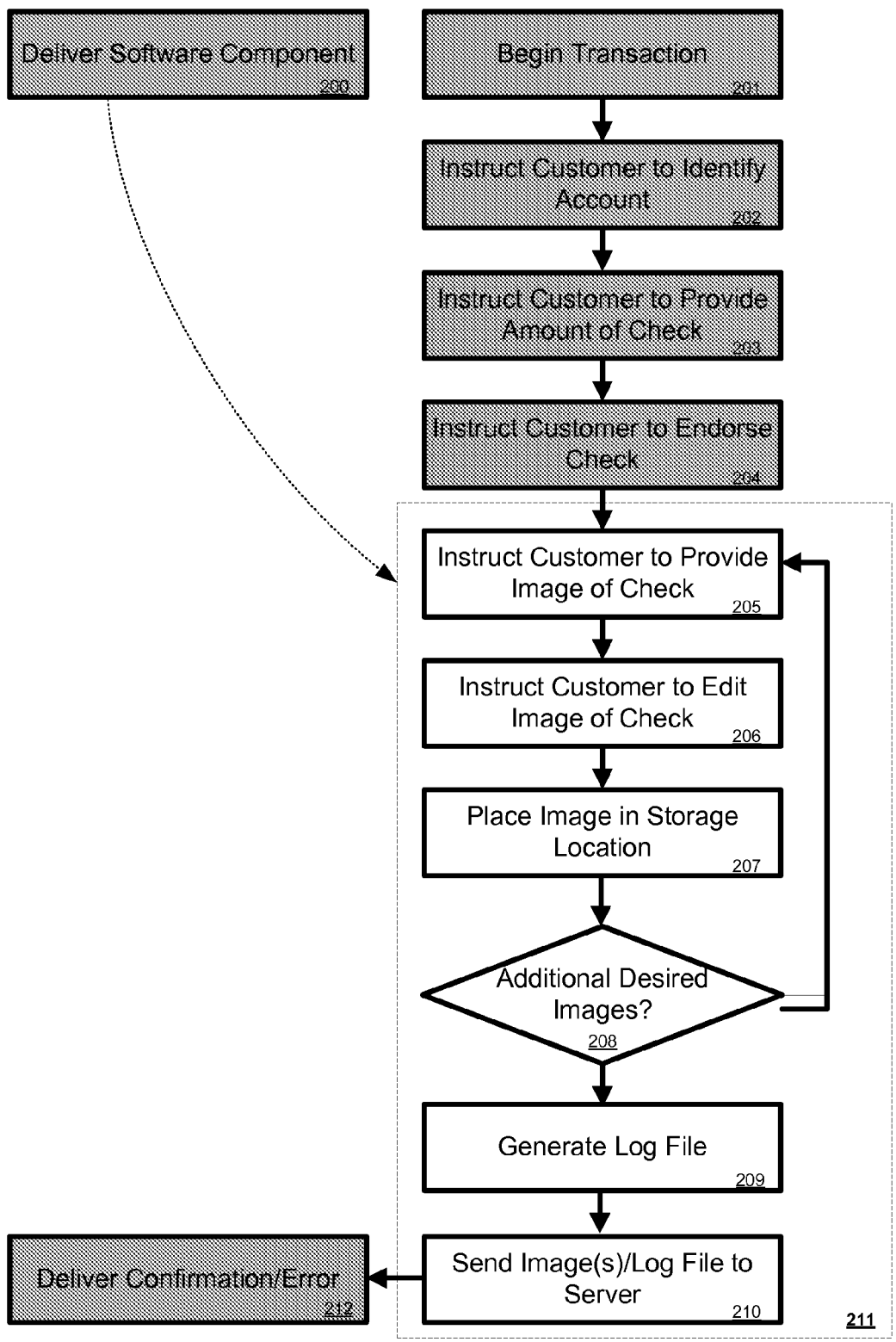
FIG. 2 illustrates a method for facilitating deposit of a check from a customer-controlled general purpose computer.
Figure 3:
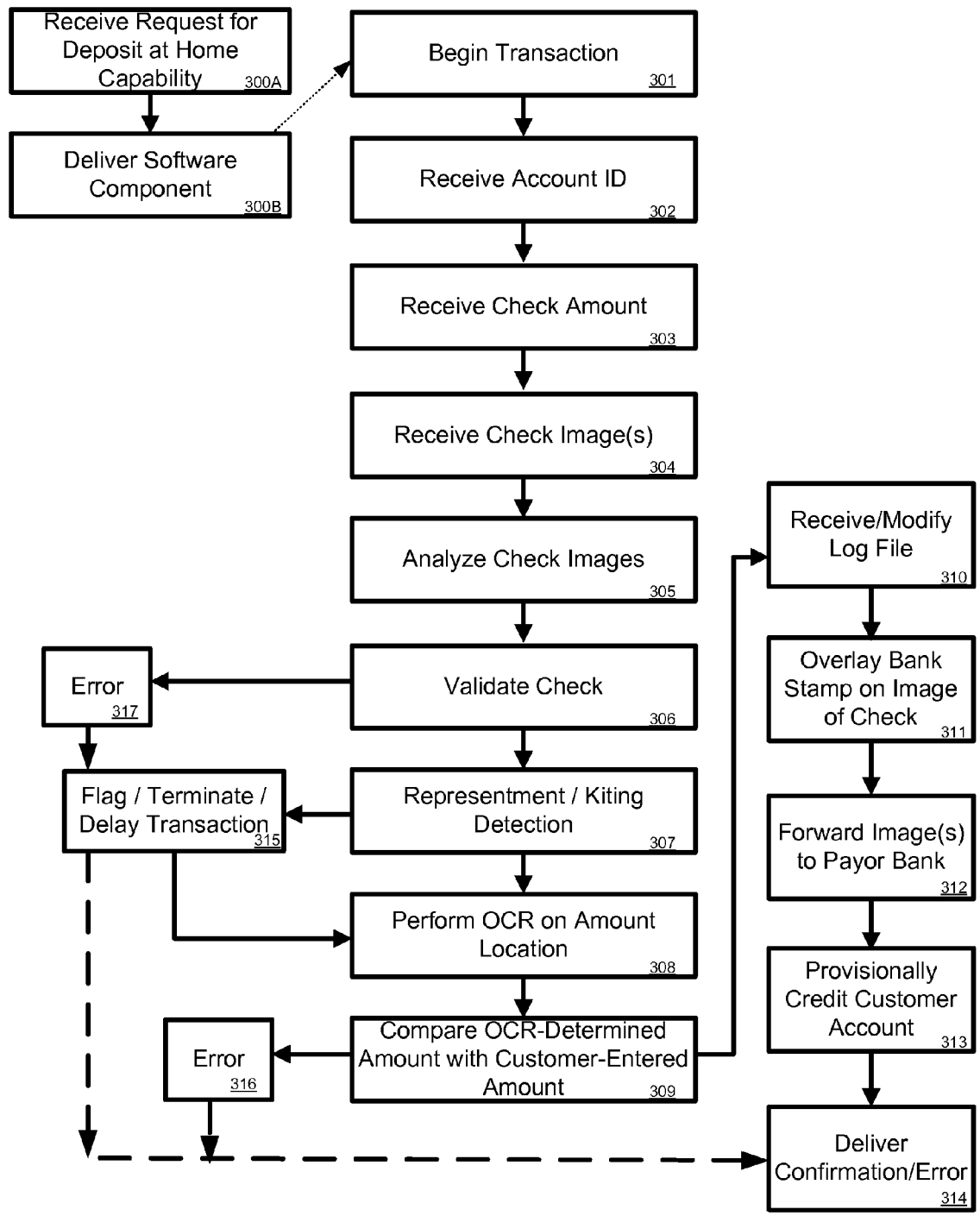
FIG. 3 illustrates a method for processing a check deposit.

FIGS. 1, 2, and 3 are generally directed to a variety of aspects of a system for processing remote deposit of checks as contemplated for use in connection with various embodiments of the invention. FIG. 1 illustrates an exemplary system in which the described embodiments may be employed. System 100 may include account owner 110, e.g., a bank customer who may be located, for example, at the customer's private residence. The account owner 110 may be utilizing a customer-controlled, general purpose computer 111. A general purpose computer 111 is generally a Personal Computer (PC) running one of the well-known WINDOWS® brand operating systems made by MICROSOFT® Corp., or a MACINTOSH® (Mac) brand computer, running any of the APPLE® operating systems. General purpose computers are ubiquitous today and the term should be well understood. A general purpose computer 111 may be in a desktop or laptop configuration, and generally has the ability to run any number of applications that are written for and compatible with the computer's operating system. The term "general purpose computer" specifically excludes specialized equipment as may be purchased by a business or other commercial enterprise, for example, for the specialized purpose of high-speed, high-volume check deposits. A particular advantage of a system as illustrated in FIG. 1 is its ability to operate in conjunction with electronics that today's consumers actually own or can easily acquire, such as a general purpose computer, a scanner, and a digital camera.

General purpose computer 111 may also be "customer-controlled." A common example of a customer-controlled computer would be a typical computer located in a private residence. The owner of such a computer typically has the power to install programs and configure the computer as they wish, subject to certain security restrictions that may be imposed by the hardware or software manufacturers. A customer-controlled computer need not be located in a private residence, however. For example, computers in college dormitories, in workplace offices, and so forth may also be considered to be "customer-controlled."

An example of a computer that would not be considered customer-controlled would be an Automatic Teller Machine (ATM) that is typically controlled by a bank or other business. Although a customer may access and utilize an ATM machine, the ATM machine is not customer-controlled because the allowed uses of the ATM machine are highly restricted. Relevant factors in determining whether a machine is customer controlled are thus the scope of operations that a customer may perform using the machine, and extent to which the customer can reconfigure the machine in some way by adding software and/or hardware components. In general, any customer ability to add software and/or hardware components is adequate to qualify a computer as customer-controlled.

One of the applications that may run on a general purpose computer 111 in connection with the invention is a browser. Common browsers in use today are, for example, the popular INTERNET EXPLORER® line of browsers made by MICROSOFT® Corp., the FIREFOX® browsers distributed via the MOZILLA® open source project, and the NETSCAPE NAVIGATOR® browsers also distributed via the MOZILLA® open source project. Browsers generally allow users to point to a Uniform Resource Locator (URL), and thereby retrieve information such as a web page. For example, a browser application on computer 111 could retrieve a web page that is kept at server 131, and display the web page to the account owner 110, as is generally known and appreciated in the industry and by the general public.

Another application, or set of applications, that may run on a general purpose computer 111 in connection with the invention comprises "virtual machine" technologies such as the JAVA® virtual machine software distributed by SUN MICROSYSTEMS® Corp, and .NET® Framework distributed by MICROSOFT® Corp. In general, such applications facilitate execution of computer programs in a variety of computing environments. For example, a JAVA® applet is a computer program (which may be alternatively referred to herein as a "software component") that can execute on any computer running the JAVA® virtual machine software. The applet may be provided to virtual machine software in a "source code" format, and may be compiled by a "just in time" compiler, so as to put the applet in a form that can be executed by the hardware associated with the particular computing device. These technologies are known in the art and may be utilized in connection with a system as illustrated in FIG. 1.

An image capture device 112 may be communicatively coupled to the computer 112. Image capture device may be, for example, a scanner or digital camera. Computer 111 may comprise software that allows the user to control certain operations of the image capture device 112 from the computer 111. For example, modern scanner users may be familiar with the TWAIN software often used to control image capture from a computer 111. Similarly, digital cameras often ship along with software that allows users to move images from the camera to a computer 111, and may also provide additional functions, such as photo editing functions crop and rotate.

Financial institutions 130, 140 and 150 may be any type of entity capable of processing a transaction involving a negotiable instrument. For example, financial institutions 130, 140 and 150 may be a retail bank, investment bank, investment company, regional branch of the Federal Reserve, clearinghouse bank and/or correspondent bank. A negotiable instrument may be described as a contract that obligates one party to pay a specified sum of money to another party. By way of example, and not limitation, negotiable instruments may include a check, draft, bill of exchange, promissory note, and the like.

Financial institution 130 is illustrated as associated with a server 131. Financial institution 130 may maintain and operate server 131 for the purposes of communicating with customers such as 110. Alternatively, such server may be maintained and operated by one or more third party vendors who act under the instructions of the financial institution 130, but possess skills and resources that may be more effective in competent operation of electronics. Such arrangements are well known in the industry and in this case the server 131 is nonetheless considered to be "associated" with the financial institution 130.

Account owner 110 may be an individual who owns account 160, which may be held at financial institution 130. As such, account owner 110 may be described as a customer of financial institution 130. Account 160 may be any type of account for depositing funds, such as a savings account, checking account, brokerage account, and the like. Account owner 110 may communicate with financial institution 130 by way of communication network 120, which may include an intranet, the Internet, a local area network (LAN), a wide area network (WAN), a public switched telephone network (PSTN), a cellular network, a voice over internet protocol (VoIP) network, and the like. Account owner 110 may communicate with financial institution 130 by phone, email, instant messaging, facsimile, and the like.

In one contemplated embodiment, network 120 is a publicly accessible network such as the Internet, which can presently be accessed from many private residences and many public places such as college campuses, airports, coffee shops, and restaurants throughout the United States as well as many other countries of the world. A variety of technologies are available to establish secure connections over such a public network, so that data transmitted between computer 111 and a server 131 associated with the institution 130 remains either inaccessible or indecipherable by third parties that may intercept such data. The invention may make use of any such security technologies.

Financial institutions 130, 140 and 150 may communicate with each other via a network 125. Network 125 may be a publicly accessed network such as 120. Alternatively, network 125 may have certain characteristics that differ from network 120, due to the different requirements of bank-to-bank communications. For example, one might envision certain security features and access restrictions being more important in bank-to-bank communications.

In an embodiment, account owner 110 may wish to deposit a check that is drawn from payor account 170 at financial institution 150. Account owner 110 may deposit the check into customer account 160 by converting the check into electronic data, e.g., an image, and sending the data to financial institution 130. Various embodiments of the invention described herein may be carried out by financial institution 130 electronics such as server 131 upon receipt of a check image from computer 111. However, those of skill in computing and software technologies will appreciate that functionality can be distributed across a variety of devices and therefore some of the method steps, subsystems, and computer readable media associated with the invention may in some embodiments be located outside of the range of what would be considered financial institution 130 electronics, e.g., might be located at computer 111 or elsewhere in the network 120.

Account owner 110 may convert the check into a digital image by scanning the front and/or back of the check using image capture device 112. Account owner 110 may then send the image to financial institution 130. Sending the image may be referred to as "presenting" the check. Upon receipt of the image, financial institution 130 may credit the funds to account 160 in a "soft post" operation. In a soft post operation, the funds appear to be available for use by a customer, and may in fact be available for use, but at the very least some indication is retained to note that the funds have not actually been received from the payor bank. When the funds are received from the payor bank, the "soft post" is converted to a "hard post" and the indication is removed, along with any further restriction on the use of the funds. Financial institution 130 may clear the check by presenting the digital image to an intermediary bank, such as a regional branch of the Federal Reserve, a correspondent bank and/or a clearinghouse bank.

For example, the check may be cleared by presenting the digital image to financial institution 140, which may be a regional branch of the Federal Reserve, along with a request for payment. Financial institution 130 and 150 may have accounts at the regional branch of the Federal Reserve. As will be discussed in greater detail below, financial institution 130 may create a substitute check using the image provided by account owner 110 and present the substitute check to financial institution 140 for further processing. Upon receiving the substitute check, financial institution 140 may identify financial institution 150 as the paying bank (e.g., the bank from which the check is drawn). This may be accomplished using a nine-digit routing number located on the bottom left hand corner of the check. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that embodiments of the invention are not specifically limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check may be cleared internally.

FIG. 2 illustrates a method for facilitating deposit of a check from a customer-controlled general purpose computer. The various steps of FIG. 2 may be viewed as performed by a server computer associated with a financial institution, in conjunction with a software component that operates from a customer-controlled general purpose computer. Various of the steps are contemplated as performed by the server, while various other steps are contemplated as performed by the software component.

In the embodiment illustrated in FIG. 2, the darker boxes indicate steps that are performed by the server, for example by delivering information to the user through the user's browser application. Making information available on a server to customers with a browser is considered to be effectively "delivering" such information for the purposes of this document. The lighter boxes inside 211 indicate steps that are performed by the software component, as it executes on the customer computer. Those of skill will recognize that alternative configurations are readily achievable by moving functions from server to software component or vice-versa.

The server may first deliver a software component to the customer-controlled general purpose computer 200. This may be done in response to a customer request for the capability of making deposits from his computer. In one embodiment, the financial institution may provide such capability only to customers that meet predetermined criteria of trustworthiness. For example, it can be required that the customer's accounts are in good standing, that the customer relationship has lasted a predetermined amount of time, that the customer has a predetermined number of financial service products with the financial institution (e.g. bank accounts, mortgages, insurance policies, etc.), that the customer has a predetermined level of assets with the financial institution, and so forth.

The software component may be configured to facilitate the deposit transaction in a variety of ways as illustrated herein. In one embodiment, the software component may be compatible with the JAVA® or .NET® technologies described above. Such configurations allow for widespread dissemination and successful operation in a wide variety of computing environments as may exist on customer-controlled general purpose computers.

Where the software component is written for JAVA®, .NET®, or any other such technology, it is useful in step 200 to first determine whether the customer-controlled general purpose computer has an appropriate virtual machine application installed, e.g. JAVA® Virtual Machine (JVM) or .NET® framework. If the computer does not have the appropriate application installed, such application may be automatically installed, or the customer may be directed to a location from which such application may be downloaded and installed. The software component may then be delivered 200, and should work as intended. The various other steps of FIG. 2 may now take place, or may take place at some subsequent time using the software component as previously downloaded.

After downloading or otherwise accepting the software component, and assuming the customer has an appropriate image capture device, the customer now has the capability to make deposits from his general purpose computer. For example, the customer points his browser to a bank website, where a link may be available that causes the bank server to initiate a deposit transaction 201. The customer may be asked to log in using a user name and password.

The customer may next be instructed to identify an account into which the deposit will be made 202. This can be done, for example, by providing a webpage that lists the available accounts, along with an instruction to select an account. Alternatively, a box may be provided into which the customer may type an account number, along with an appropriate instruction to type the number of the desired account. The account may be any account, and need not necessarily be the customer's own account, although it is contemplated that a large number of customer deposits may be made into the transacting customer's account, and embodiments may find it useful to restrict the allowed accounts to the customer's own accounts. In such embodiments, if the customer has just one account with the financial institution, step 202 may be eliminated because the only available allowed account would be the customer's single account.

The customer may next be instructed to identify an amount of a check or other negotiable instrument he wishes to deposit into the selected account 203. In one embodiment, this can be done similarly to step 202 by providing a webpage with a integer entry box into which the customer may type an amount, along with an appropriate instruction to type the amount of the check. The customer may also be instructed to endorse the check 204.

The customer may next be instructed to provide an image of a front side of a check 205, for example, by using an image capture device. In one embodiment, the customer may be instructed to place the check face down on a flatbed scanner, and may further be instructed as to the location and orientation of the check on the scanner. If the customer is instructed to take a digital photograph of the check using a digital camera, the customer may be instructed as to the position and orientation of the check, lighting, angle of camera, distance and focal length (zoom) of camera, and so forth. The software component may be useful at this point in providing a graphical illustration of just how the customer should provide the image. The customer may further be given instructions as to how to activate the image capture device and/or move the image from the device to the general purpose computer.

In one embodiment, it is contemplated that the software component allows for control of transaction flow and transaction data throughout the various aspects the transaction. For example, the software component may open a folder in a storage location, such as the hard drive of the general-purpose computer, and may work in conjunction with any software that interfaces with the image capture device to deposit the image in such folder. This may advantageously be conducted in a secure manner to prevent any unwanted image diversion or tampering. The hard drive of the general-purpose computer is considered to be a storage location that is controlled by said customer-controlled general purpose computer, but other storage locations such as disk drives, networked drives, and so forth may also be effectively controlled by the general purpose computer.

The software component may itself perform operations such as opening a folder and placing the images therein, or may effectively achieve such operations by instructing the customer and/or other applications to do so. All software operates to some extent under the control and with the support of an operating system and/or virtual machine framework running on the general purpose computer, and such support is of course appropriate in embodiments of the invention.

The software component may next cause the image of the check to be presented to the customer for editing, e.g. by asking the customer to crop and/or rotate the check image to a predetermined orientation 206. In embodiments using a scanner, an image of the entire scanner bed, or some otherwise too large image may be generated. If the check was placed in the top left corner of the scanner bed, the customer may be asked to indicate the bottom right corner of the check image, and the image may be automatically cropped to contain only the check image in the rectangular area between the customer's selected point and the top left corner of the scanner bed, thereby removing a portion of the originally obtained image.

An appropriately edited image of the check may be placed in the storage location 207. If further images are necessary 208, steps 205-207 may be repeated as necessary. For example, the customer may be instructed to endorse and provide an image of the back side of a check. To ensure the check is appropriately voided, the customer may be asked to write "void" on the check and re-scan the front of the check. However, it will be appreciated that a "void" instruction could be easily spoofed, for example by photocopying the check and voiding the photocopy, or by placing a transparent material over the check that bears the void. Therefore, regardless of whether the customer is instructed to re-capture an image of a voided check, there is some possibility of representment, i.e. attempting to rescan and represent the check at a later time. Various techniques for "duplicate detection," may be used to identify and address such attempts, as described in U.S. Patent Application (client reference US-0159.01/USAA 0187).

A log file may be generated 209 to collect data for processing or troubleshooting the deposit transaction. The log file may be placed in the storage location along with the various images of the check.

Once the desired images are collected and edited, they may be delivered to the server for processing the deposit 210. The log file may also be delivered at this time. Once such files are delivered, they may be deleted from the customer's general purpose computer. If the server determines that the delivered images and any corresponding data are sufficient to go forward with the deposit, the customer's account may be provisionally credited with a soft post, and a confirmation page may be delivered to the customer via the customer's browser application 212. The customer may be instructed to destroy, e.g. by shredding, the actual physical check or other negotiable instrument, however as described above such a requirement is unenforceable and some risk of representment remains which can be addressed as described below. Under the current check handling procedures in the United States, the physical check is not necessary in processing a deposit, nor is it necessary to keep the original check in bank or customer records.

FIG. 3 illustrates a method for processing a check deposit. The method of FIG. 3 is designed to complement that of FIG. 2 and to illustrate exemplary steps that may be carried out by a server or other electronics operated by a financial institution before, during, and after the various steps of FIG. 2 are carried out.

In general, as illustrated in FIG. 3, such server may receive a request for deposit at home capability 300A, and in response to such request may deliver a software component to the requesting customer 300B. As with FIG. 2, intermediate steps may comprise determining if the customer is in fact eligible for a remote deposit program, and ensuring the customer has an appropriate virtual machine environment installed on their general purpose computer—in embodiments where the software component requires such an environment.

A transaction may be initiated 301 upon receiving a customer indication that a deposit transaction is desired. The customer is instructed to identify an account per FIG. 2, and as a result the financial institution electronics receive an account identifier (ID) 302. Similarly, financial institution electronics receive check amount 303. At this juncture the software component at the customer computer handles image capture processes, which may or may not involve the financial institution's server and other electronics in some capacity until such time as check image(s) are received 304.

Upon receipt of check images, they may be analyzed 305 to obtain check identification information. For example, an Optical Character Recognition (OCR) process or Digital Signal Processing (DSP) process may be invoked to determine certain information about the check. Such information may be validated 306 by comparing information so obtained against a variety of other data and/or rules governing permissible (or, conversely, impermissible) aspects of checks identification data. A more in-depth discussion of validation procedures that may be implemented in steps such as 305 and 306 is provided below with reference to FIGS. 4, 5, and 6.

If the check identification data obtained in step 305 cannot be validated in step 306, an error may result 317, and the deposit transaction can be flagged, delayed, or aborted 315. If terminated, an error message can be delivered to the customer 314, explaining the action taken and optionally providing a reason that the transaction for the action. If the transaction is flagged, it will be allowed to proceed through the various other steps and result in a soft post 313 to the customer account. If delayed, the soft post 313 will be made only after further scrutiny of the transaction, or will be avoided entirely. In each of the above scenarios, a notification of action taken may also be sent to the customer, optionally including an explanation for the reason the action was taken and steps for correcting the error.

Representment and kiting detection processes may be carried out to determine whether the check was previously deposited or is suspected to be part of a kiting operation 307. As illustrated in FIG. 3, if a representment or kiting operation is detected in 307, the transaction may be flagged, delayed, or terminated 315.

OCR may further be performed on a check amount location 306, and the amount as determined using OCR may be compared against the customer-entered amount received pursuant to step 303. If the amounts do not match, an error 316 can result, terminating the transaction and delivering appropriate information concerning the error to the customer 314. OCR may further be performed on any other aspects of the check image at this time if it is advantageous in specific embodiments to do so.

The server may further receive and modify a deposit transaction log file 310. Alternative versions of the images received may be generated and placed in the log file. Check 21 regulations require a bi-tonal TIFF formatted image, which is generally a low-quality image format as compared to other available image formats. Therefore, it is desirable in some embodiments to retain both a "good" image in an initial format, e.g., in a JPEG format, as well as the modified bi-tonal TIFF required by Check 21. This way, if any troubleshooting is necessary, a good image of the check remains available.

In some embodiments, a bank stamp may be overlaid on the image of the back of the check 311, just as if the check was physically deposited at a bank. Appropriate images may be forwarded to the payor bank for payment 312, and meanwhile, the customer's account may be provisionally credited in the amount of the check 313. A confirmation can be delivered to the customer 314.

At 312, in one embodiment, the bank may forward an image or images to a payor bank. Provisionally crediting the customer account 513 with a "soft post" and delivering a confirmation to the customer-controlled general purpose computer 514 may be done before, after, or contemporaneously with step 312.

In one embodiment, forwarding an image or images to a payor bank 312 may be performed pursuant to an Automated Clearinghouse (ACH) transaction. ACH transactions typically include payment instructions to debit and/or credit an account. Banks often employ ACH service providers to settle ACH transactions. Examples of ACH service providers include regional branches of the Federal Reserve and the Electronic Payments Network (EPN).

In an ACH transaction, the payee's (customer's) bank may be referred to as the originating depository financial institution (ODFI). Upon receipt of appropriate check information, the payee's bank may credit funds to the payee's account and generate an ACH debit entry to the payor's account, which may be presented to the ACH service provider for processing.

The ACH service provider may process the debit entry by identifying the account and bank from which the check is drawn. The bank from which the check is drawn (i.e., the payor's bank) may be referred to as a receiving depository financial institution (RDFI). If the payor's bank verifies the transaction, the ACH service provider may settle the transaction by debiting the payor's bank and crediting the payee's bank. The payor's bank may then debit the payor's account.

A substitute check is typically a paper reproduction of an original check and may be the legal equivalent of the original check. Substitute checks were authorized under The Check Clearing for the 21st Century Act, commonly known as Check 21. The Act was enacted to facilitate the check clearing process by allowing banks to transmit electronic images of checks (e.g., substitute checks) to other banks rather than physically sending the original paper checks. Check 21 does not require that banks use substitute checks. In fact, many banks may have voluntary agreements to accept certain electronic images of checks even though the images may not qualify as substitute checks under Check 21. If a bank does not have a voluntary agreement and/or refuses to accept an electronic image, the financial institution is required under Check 21 to accept a substitute check in lieu of the original check.

The bank may process the ACH debit entry, substitute check, and/or electronic image. As noted above, the bank may present the ACH debit entry to an ACH service provider (e.g., EPN), which may be responsible for settling the transaction between the payee's bank and the payor's bank. The bank also may convert the digital image into a substitute check and present the substitute check to an intermediary bank (e.g., a regional branch of the Federal Reserve) to complete the check clearing process. If the payor's bank and the payee's bank are the same, the transaction can be handled internally at the payor bank by simply debiting the account of one customer and crediting the account of another. Thus, an intermediate step may comprise identifying if the payor bank and the payee bank are one and the same, or otherwise operating in a closely cooperative manner.

Figure 4:
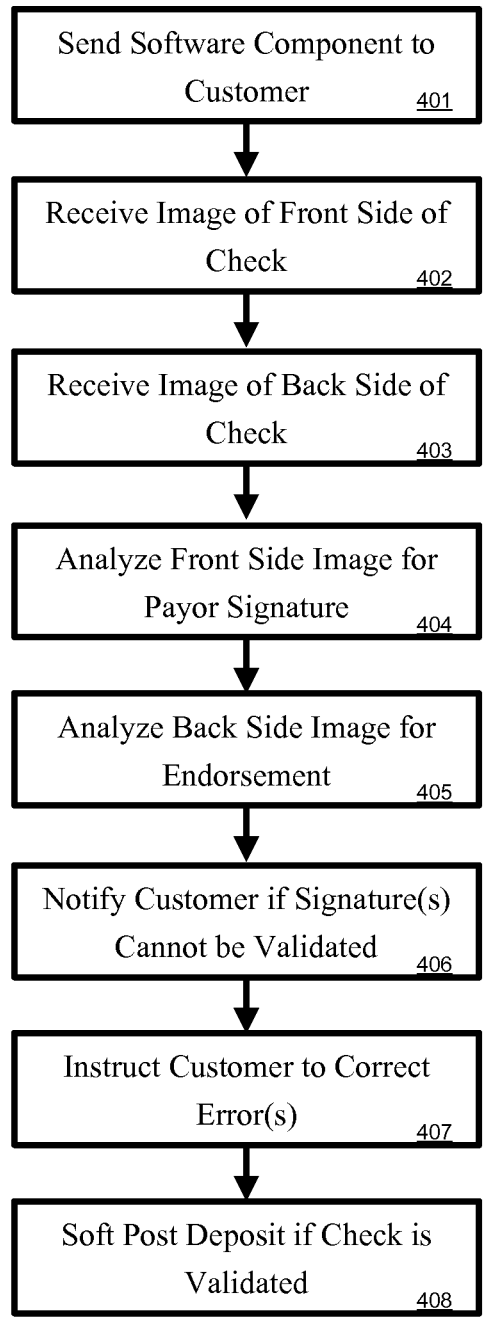
FIG. 4 illustrates a method comprising detecting the presence of signatures on a received check image so as to validate a check.
Figure 5:
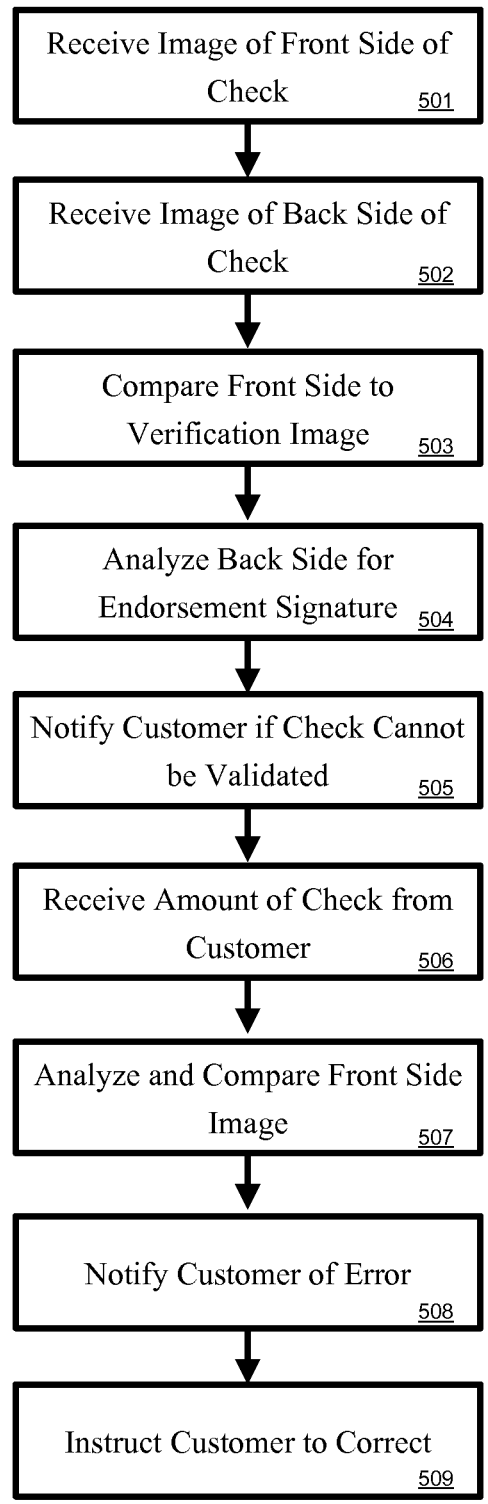
FIG. 5 illustrates an method comprising conducting "face recognition" of a received check image to verify it's authenticity.
Figure 6:
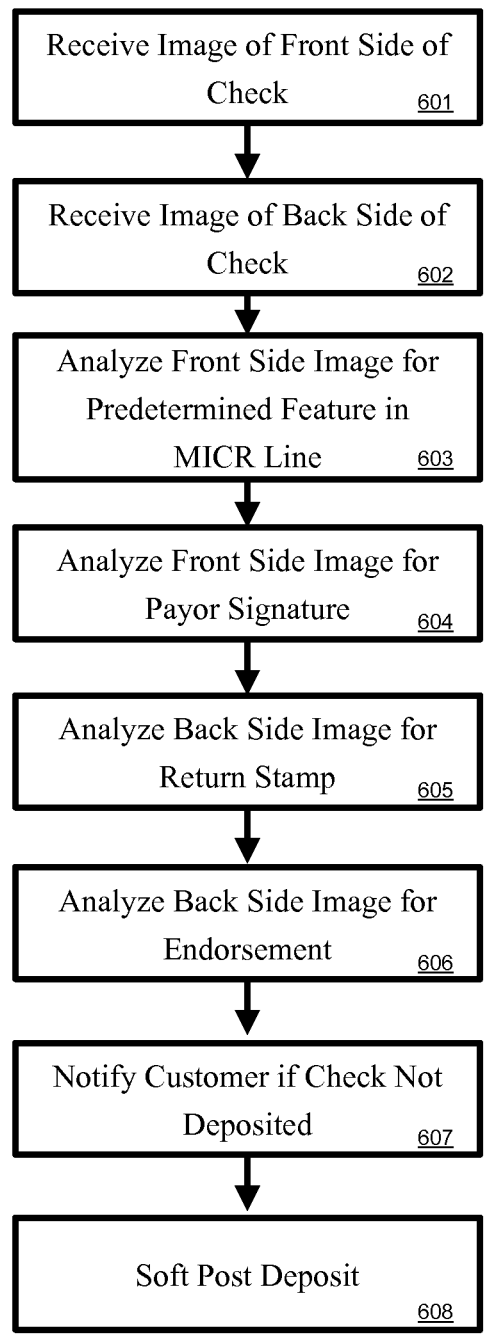
FIG. 6 illustrates an exemplary method comprising detecting MICR line indications that a check is no longer valid

Each of FIGS. 4, 5, and 6 provide exemplary methods for analyzing an validating an image of a remotely deposited check received by financial institution electronics as may be carried out in a system comprising features as disclosed in FIGS. 1, 2, and 3, and in particular as part of steps 305 and 306 in FIG. 3. However, it should be emphasized that while the various aspects of FIGS. 1, 2, and 3 provide useful context for FIGS. 4, 5, and 6, the disclosed aspects of FIGS. 1, 2, and 3 are in no way required to carry out the steps of FIGS. 4, 5, and 6.

Furthermore, while FIGS. 4, 5, and 6 are illustrated and discussed as methods, it will be acknowledged that they also disclose corresponding systems and computer readable media designed to carry out such methods. FIGS. 4, 5, and 6 may be carried out by electronic subsystems within financial institution electronics such as server 131, which may comprise a variety of other electronics such as routers, switches, and modems. The steps of FIGS. 4, 5, and 6 may also be recorded as instructions on computer readable media designed for causing financial institution electronics to carry out the disclosed methods.

FIG. 4 generally contemplates a novel method for detecting the presence of signatures on a received check image. Embodiments may analyze a check for the mere presence of any signature marking, or may go further to compare a detected signature to a signature verification file.

A software component may be electronically sent to a customer controlled general purpose computer 401, said software component configured to facilitate electronically sending an image of a front side of a payor check and/or an image of a back side of said payor check. As described above, said software component is advantageously configured for execution by a virtual machine framework. The software component can manage capture and delivery of check images as discussed above.

An image of a front side of the payor check is thus electronically received 402 by financial institution electronics. An image of a back side of the payor check may also be electronically received 403. Signatures may be present on the front and back sides of a check as is well known. A signature line is typically present on the bottom right of personal checks, and an endorsement location is typically marked off at the top back of personal checks. Of course, other signature locations may be customary in business checks or other negotiable instruments and the invention can be modified as necessary to adapt to appropriate signature locations.

An electronic analysis of the image of a front side of said payor check may be automatically performed 404 to determine whether a payor signature is present. Similarly, if an image of the back of the check is also received, an electronic analysis of the back side may be automatically performed 405 to determine whether an endorsement signature is present.

The electronic analysis performed to determine whether a payor signature is present may comprise determining a presence of any signature marking at a predetermined location on the image of a front side of said payor check. The predetermined location may be, for example, a location in the bottom right corner of a front side of a check typically used as a signature line. Similarly, The electronic analysis performed to determine whether an endorsement is present may comprise determining a presence of any signature marking at a predetermined location on the image of a back side of said payor check. The predetermined location may be, for example, the endorsement area provided on the back side of checks. Such embodiments are possible when many checks generally conform to predetermined size and arrangement specifications. Alternatively, more robustly adaptable embodiments are feasible in which the entirety of a check image may be scanned and any presence of a signature is adaptively discovered.

Alternatively, the electronic analysis performed to determine whether a payor signature is present may comprise comparing, for example, a predetermined portion said image of a front side of said payor check to a payor signature verification image. For example, if the receiving bank has access to a file comprising an image of the payor's signature, such file may be electronically compared to the portion of the check image bearing such signature. Image comparison techniques are generally known in the art and may be set to require various levels of similarity between compared images. As might be expected, one signature often differs from another to some degree, even if both are authentic. Thus, signature matching techniques should be appropriately set to allow for differences. In one embodiment, signature image modification may be performed prior to comparison, so as to more easily identify certain more easily identifiable characteristics of a signature.

In general, the use of a signature verification may entail, in one embodiment, identifying a payor, looking up a payor identifier such as payor name in a database, retrieving a payor signature verification image, and finally comparing said verification image to a payor signature gathered from a predetermined location of a received check image. Similarly, a payee may be identified, the payee signature verification image may be retrieved, and said verification image may be compared to a predetermined location on the received image of the back side of the check.

Similarly, the electronic analysis performed to determine whether an endorsement is present may comprise comparing a predetermined portion said image of a back side of said payor check to an endorsement signature verification image. For example, if the receiving bank has access to a file comprising an image of the customer's signature, such file may be electronically compared to the portion of the check image bearing such signature.

If the payor signature is not present on said image of a front side of said payor check or if said endorsement signature is not present on said image of a back side of said payor check, then a customer may be automatically notified 406. For example, the customer may be automatically notified that said payor check will not be deposited.

If a correctable error is discovered, for example if no endorsement signature is detected, the customer may be automatically instructed correct such error 407. The customer may be automatically instructed to endorse said payor check and to resend said image of a back side of said payor check.

If the payor signature is present on the image of a front side of said payor check and, in embodiments that also check for an endorsement signature, if said endorsement signature is present on said image of a back side of said payor check, then subject to other processing that may occur, the check deposit may be automatically soft posted to a customer account 408.

FIG. 5 generally contemplates a novel method for conducting a "face recognition" on a check to verify it's authenticity. An image of a front side of the payor check is electronically received 501 by financial institution electronics. An image of a back side of the payor check may also be electronically received 502.

At least a portion of said image of a front side of said payor check may be automatically electronically compared to a payor check verification image 503. A payor check verification image may comprise, for example, an image of a previous check drafted by said payor, an image of a signature portion of a previous check drafted by said payor, an image of a name and address portion of a previous check drafted by said payor, and/or an image retrieved from said payor bank.

An electronic analysis of said image of a back side of said payor check may be automatically performed to determine whether an endorsement signature is present on said image of a back side of said payor check 504.

A customer may be automatically notified 505 if the check cannot be validated. For example, a customer may be automatically notified if said at least a portion of said image of a front side of said payor check is not substantially similar to said payor check verification image. In one embodiment, the customer may be notified that the check will not be deposited. In another embodiment, the customer may be given an opportunity to correct any errors that may have been identified.

An amount of said check may be electronically received 506 from said customer, and said image of a front side of said payor check may be automatically electronically analyzed to determine a "second" amount of said check 507. When the amount data received from the customer and the amount as determined by the image analysis are compared, they should match. If they do not match, i.e. if said first amount differs from said second amount, then the customer may be notified of the error 508, for example by automatically notifying a customer that a deposit cannot proceed. The customer may be instructed to correct the error 509, for example by instructing said customer to resend said first amount of said check.

FIG. 6 generally contemplates a novel method for detecting MICR line indications that a check is no longer valid. An image of a front side of the payor check is electronically received 601 by financial institution electronics. An image of a back side of the payor check may also be electronically received 602.

An electronic analysis of a MICR line portion of said image of a front side of said payor check may be automatically performed 603 to determine if said MICR line comprises at least one predetermined feature. Examples of predetermined feature include generally aspects of a MICR line that indicate a check was previously presented to a bank and therefore is likely no longer valid. A predetermined feature may comprise, for example, a number 4 in position 44 on said MICR line. In another embodiment, a predetermined feature may comprise an identification of an amount of said check in said MICR line.

The term "electronic analysis," as used herein, generally refers to image analysis using Digital Signal Processing (DSP). OCR can be thought of as one form of DSP in which the signals processed are determined to be numbers or letters, and a file is generated with the numerals and/or text that is recognized.

OCR may be performed on the check's MICR line location 305 to determine information such as payor bank routing number, account number, and check number. The bank routing number may then be validated 306 against a list of valid routing numbers to ensure that it corresponds to a legitimate bank, and in some embodiments, to ensure it corresponds to a United States bank. In one embodiment, the OCR is conducted in real time, i.e. prior to confirming the deposit transaction for the customer, so as to validate some initial deposit information immediately, and thereby filter transactions that may result in errors were the OCR to be conducted at some later time. In other embodiments, certain efficiencies may be gained by performing "batch" OCR operations at some later time.

In one embodiment, an OCR process can conveniently be applied to an image of a back side of a check in addition to performing OCR on the image of the front side of said check. One problem that may occur involves customer submission of two front images, instead of one front image and one back image. OCR may be performed on a MICR line location of an alleged image of a back side of said check to confirm that said alleged image of a back side of said check does not bear a MICR line. If no MICR line is present in such location then it is more likely that the alleged image of a back side of said check is in fact the back, and not the front, of the check.

Another advantageous use of OCR is on the endorsement location on the back of a check. By performing OCR, it may be possible in some embodiments to determine that the signature matches that of the payor or drafter of the check. However, often signatures are illegible. Thus in one embodiment it is advantageous to determine that some mark or signature is present in the endorsement location on the back of the check, without conducting any further signature identification procedures.

As with above described embodiments, the electronic analysis may also include determining whether a payor signature is present on said image of a front side of said payor check. Also, an electronic analysis of said image of a back side of said payor check may be automatically performed to determine whether and endorsement signature and/or a return stamp is present. A predetermined portion said image of a front and/or back side of said payor check may be compared to a signature verification image.

If the MICR line comprises said at least one predetermined feature, a customer can be automatically notified of the error, for example in a notification that due to MICR line error, said payor check will not be deposited. Similarly, a customer may be automatically notified that said payor check will not be deposited if said return stamp is present on said image of a back side of said payor check. The presence of a return stamp indicates that a check was already deposited with a bank and therefore is likely no longer valid.

If said MICR line does not comprise said at least one predetermined feature, and subject to any further processing that may occur, the check is verified and a deposit can be automatically soft posted to the customer's account.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the processing of the disclosed embodiments.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed:

1. A server implemented method for processing a check, comprising:
   receiving, by a server, a request from a customer-controlled device, the customer-controlled-device including a general purpose image capture device, to initiate a session;
   transmitting, by the server to the customer-controlled device, software facilitating the session for processing the check; and
   upon determining, by the server, if a customer meets at least one criteria of trustworthiness based on information included in the request, initiating the session by the server, wherein the server is further configured to facilitate the session by:
   receiving an image of a first side of the check captured by the general purpose image capture device of the customer-controlled device during the session, wherein the image of the first side includes information identifying a Magnetic Ink Character Recognition (MICR) line portion;
   analyzing in real time the image of the first side during the session;
   identifying the MICR line portion based on the analysis during the session;
   determining whether to process the check for a deposit transaction based on the identified MICR line portion during the session;
   in response to successfully identifying the MICR line portion, transmitting a notification to the customer-controlled device that the check will be processed for the deposit transaction; and
   processing the check to complete the deposit transaction.

2. The server implemented method of claim 1, wherein the image of the first side further includes monetary amount information, and the server further facilitates the session by:
   identifying the monetary amount information based on the analysis;
   determining whether to process the check for a deposit transaction based on the identified monetary amount information; and
   in response to successfully identifying the MICR line portion and the monetary amount information, transmitting the notification to the customer-controlled device that the check will be processed for the deposit transaction.

3. The server implemented method of claim 1, wherein the server further facilitates the session by:
   receiving an image of a second side of the check captured by the general purpose image capture device of the customer-controlled device, wherein the image of the second side includes an endorsement.

4. The server implemented method of claim 3, wherein the server further facilitates the session by:
   analyzing in real time the image of the second side;
   identifying the endorsement based on the analysis;
   comparing the identified endorsement against an endorsement verification image to determine whether the identified endorsement matches the endorsement verification image; and
   determining whether to process the check for a deposit transaction based on the comparison.

5. The server implemented method of claim 4, wherein the server further facilitates the session by:
   in response to determining that the identified endorsement matches the endorsement verification image, transmitting the notification to the customer-controlled device that the check will be processed for the deposit transaction.

6. The server implemented method of claim 3, wherein the server further facilitates the session by:
   analyzing in real time the image of the second side;
   identifying the endorsement based on the analysis; and
   determining whether to process the check for a deposit transaction based on the identified endorsement.

7. The server implemented method of claim 6, wherein the server further facilitates the session by:
   in response to successfully identifying the MICR line portion and the endorsement, transmitting the notification to the customer-controlled device that the check will be processed for the deposit transaction.

8. The server implemented method of claim 1, wherein the server further facilitates the session by:
   identifying whether the image of the first side includes an endorsement based on the analysis;
   determining whether to process the check for a deposit transaction based on the identified endorsement; and
   in response to successfully identifying the MICR line portion and the endorsement, transmitting the notification to the customer-controlled device that the check will be processed for the deposit transaction.

9. The method of claim 1, wherein the criteria of trustworthiness comprises at least one of the customer's account standing, the customer's level of assets, the duration of the customer's relationship, or the number of financial service products held by the customer.

10. A server for processing a check, comprising:
    a processor;
    an interface in communication with the processor; and
    wherein the processor is configured to:
    receive a request from a customer-controlled device, the customer-controlled device including a general purpose image capture device, to initiate a session for processing a check;
    transmit, from the server to the customer-controlled device, software facilitating the session for processing the check;
    receive an image of a first side of the check, wherein the image of the first side includes information identifying a Magnetic Ink Character Recognition (MICR) line portion; and
    determine whether a customer meets at least one criteria of trustworthiness based on information included in the request from the customer-controlled device, and when the customer meets the at least one criteria, initiate the session by the processor, wherein the processor is further configured to:
    analyze in real time the image of the first side during the session;
    identify the MICR line portion based on the analysis during the session;
    determine whether to process the check for a deposit transaction based on the identified MICR line portion during the session;
    in response to successfully identifying the MICR line portion, cause the transmission of a notification to the customer-controlled device that the check will be processed for the deposit transaction during the session; and
    process the check to complete the deposit transaction.

11. The server of claim 10, wherein the image of the first side further includes monetary amount information, and the processor is further configured to facilitate the session to:
    identify the monetary amount information based on the analysis;
    determine whether to process the check for a deposit transaction based on the identified monetary amount information; and
    in response to successfully identifying the MICR line portion and the monetary amount information, cause the transmission of the notification to the customer-controlled device that the check will be processed for the deposit transaction.

12. The server of claim 10, wherein the processor is further configured to facilitate the session to:
    receive an image of a second side of the check captured by the general purpose image capture device of the customer-controlled device, wherein the image of the second side includes an endorsement.

13. The server of claim 12, wherein the processor is further configured to facilitate the session to:
    analyze in real time the image of the second side;
    identify the endorsement based on the analysis;
    compare the identified endorsement against an endorsement verification image to determine whether the identified endorsement matches the endorsement verification image; and
    determine whether to process the check for a deposit transaction based on the comparison.

14. The server of claim 13, wherein the processor is further configured to facilitate the session to:
    in response to determining that the identified endorsement matches the endorsement verification image, cause a transmission of the notification to the customer-controlled device that the check will be processed for the deposit transaction.

15. The server of claim 12, wherein the processor is further configured to facilitate the session to:
    analyze in real time the image of the second side;
    identify the endorsement based on the analysis; and
    determine whether to process the check for a deposit transaction based on the identified endorsement.

16. The server of claim 15, wherein the processor is further configured to facilitate the session to:
    in response to successfully identifying the MICR line portion and the endorsement, cause the transmission of the notification to the customer-controlled device that the check will be processed for the deposit transaction.

17. The server of claim 10, wherein the processor is further configured to facilitate the session to:
    analyze in real time the image of the first side;
    identify whether the image of the first side includes an endorsement based on the analysis;
    determine whether to process the check for a deposit transaction based on the identified endorsement; and in response to successfully identifying the MICR line portion and the endorsement, cause the transmission of the notification to the customer-controlled device that the check will be processed for the deposit transaction.

18. The server of claim 10, wherein the criteria of trustworthiness comprises at least one of the customer's account standing, the customer's level of assets, the duration of the customer's relationship, or the number of financial service products held by the customer.

19. A non-transitory computer readable medium storing instructions executable by a processor of a server, the processor of the server executing the instructions to:
receive a request from a customer-controlled computing device, the customer-controlled device including a general purpose image capture device, to initiate a session;
transmit, from the server to the customer-controlled device, software facilitating the session for processing a check;
determine whether a customer meets at least one criteria of trustworthiness based on information included in the request, and when the customer meets the at least one criteria, initiate the session by the processor of the server, wherein the processor of the server is further configured to facilitate the session by executing instructions to:
receive an image of a first side of the check during the session, wherein the image of the first side includes information identifying a Magnetic Ink Character Recognition (MICR) line portion;
analyze in real time the image of the first side during the session;
identify the MICR line portion based on the analysis during the session;
determine whether to process the check for a deposit transaction based on the identified MICR line portion during the session;
in response to successfully identifying the MICR line portion, cause a transmission of a notification to the customer-controlled device that the check will be processed for the deposit transaction during the session; and
process the check to complete the deposit transaction.

20. The non-transitory computer readable medium of claim 19, wherein the image of the first side further includes monetary amount information, and the processor of the server further executing the instructions to facilitate the session to:
identify the monetary amount information based on the analysis;
determine whether to process the check for a deposit transaction based on the identified monetary amount information; and
in response to successfully identifying the MICR line portion and the monetary amount information, cause the transmission of the notification to the customer-controlled device that the check will be processed for the deposit transaction.

21. The non-transitory computer readable medium of claim 19, the processor of the server further executing the instructions to facilitate the session to:
receive an image of a second side of the check captured by the general purpose image capture device of the customer-controlled device, wherein the image of the second side includes an endorsement.

22. The non-transitory computer readable medium of claim 21, the processor of the server further executing the instructions to facilitate the session to:
analyze in real time the image of the second side;
identify the endorsement based on the analysis;
compare the identified endorsement against an endorsement verification image to determine whether the identified endorsement matches the endorsement verification image; and
determine whether to process the check for a deposit transaction based on the comparison.

23. The non-transitory computer readable medium of claim 22, the processor of the server further executing the instructions to facilitate the session to:
in response to determining that the identified endorsement matches the endorsement verification image, cause a transmission of the notification to the customer-controlled device that the check will be processed for the deposit transaction.

24. The non-transitory computer readable medium of claim 21, the processor of the server further executing the instructions to facilitate the session to:
analyze in real time the image of the second side;
identify the endorsement based on the analysis; and
determine whether to process the check for a deposit transaction based on the identified endorsement.

25. The non-transitory computer readable medium of claim 24, the processor of the server further executing the instructions to facilitate the session to:
in response to successfully identifying the MICR line portion and the endorsement, cause the transmission of the notification to the customer-controlled device that the check will be processed for the deposit transaction.

26. The non-transitory computer readable medium of claim 19, the processor of the server further executing the instructions to facilitate the session to:
analyze in real time the image of the first side;
identify whether the image of the first side includes an endorsement based on the analysis;
determine whether to process the check for a deposit transaction based on the identified endorsement; and
in response to successfully identifying the MICR line portion and the endorsement, cause the transmission of the notification to the customer-controlled device that the check will be processed for the deposit transaction.

27. The non-transitory computer readable medium of claim 19, wherein the criteria of trustworthiness comprises at least one of the customer's account standing, the customer's level of assets, the duration of the customer's relationship, or the number of financial service products held by the customer.

* * * * *